(12) United States Patent
Won

(10) Patent No.: US 9,959,740 B2
(45) Date of Patent: May 1, 2018

(54) ELECTRONIC DEVICE FOR REMINDING OF TASK AND CONTROLLING METHOD THEREOF

(71) Applicant: Samsung Electronics Co., Ltd., Suwon-si, Gyeonggi-do (KR)

(72) Inventor: Sung-Joon Won, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 169 days.

(21) Appl. No.: 14/326,887

(22) Filed: Jul. 9, 2014

(65) Prior Publication Data

US 2015/0015409 A1 Jan. 15, 2015

(30) Foreign Application Priority Data

Jul. 12, 2013 (KR) ........................ 10-2013-0082517

(51) Int. Cl.
*G08B 5/00* (2006.01)
*G08B 21/24* (2006.01)
*G06Q 10/10* (2012.01)

(52) U.S. Cl.
CPC ........... *G08B 21/24* (2013.01); *G06Q 10/109* (2013.01)

(58) Field of Classification Search
None
See application file for complete search history.

(56) References Cited

U.S. PATENT DOCUMENTS

| | | | |
|---|---|---|---|
| 2006/0212330 A1* | 9/2006 | Savilampi | G06Q 10/109 705/7.19 |
| 2007/0143376 A1* | 6/2007 | McIntosh | G06Q 10/109 |
| 2010/0159978 A1* | 6/2010 | Sierawski | H04M 1/72519 455/550.1 |
| 2012/0159341 A1 | 6/2012 | Murillo et al. | |
| 2012/0293341 A1* | 11/2012 | Lin | B60R 25/00 340/901 |
| 2012/0309363 A1 | 12/2012 | Gruber et al. | |
| 2013/0031169 A1 | 1/2013 | Axelrod et al. | |
| 2013/0115927 A1 | 5/2013 | Gruber et al. | |
| 2014/0095172 A1* | 4/2014 | Cabaco | G10L 21/06 704/275 |
| 2014/0118148 A1* | 5/2014 | Edlund | G08B 21/0423 340/573.1 |
| 2014/0342706 A1* | 11/2014 | Cao | H04W 4/16 455/412.2 |
| 2014/0343950 A1* | 11/2014 | Simpson | G06F 3/167 704/275 |
| 2015/0094042 A1* | 4/2015 | Kaplan | H04M 1/72566 455/414.1 |

FOREIGN PATENT DOCUMENTS

WO 2012/167168 A3 12/2012

* cited by examiner

*Primary Examiner* — Julie Lieu
(74) *Attorney, Agent, or Firm* — Jefferson IP Law, LLP

(57) ABSTRACT

A method of controlling an electronic device that provides a reminder of a task is provided. The controlling method includes receiving an input of a content of a reminder target task, designating a related application that is linked with the reminder target task, and generating and storing the reminder target task of which the content is to be displayed using a predetermined event as a trigger.

36 Claims, 33 Drawing Sheets

ELECTRONIC DEVICE FOR REMINDING OF TASK AND CONTROLLING METHOD THEREOF

CROSS-REFERENCE TO RELATED APPLICATION(S)

This application claims the benefit under 35 U.S.C. §119(a) of a Korean patent application filed on Jul. 12, 2013 in the Korean Intellectual Property Office and assigned Serial No. 10-2013-0082517, the entire disclosure of which is hereby incorporated by reference.

TECHNICAL FIELD

The present disclosure relates to an electronic device that reminds of a task and a controlling method thereof.

BACKGROUND

Recently, demand for a smart phone or a tablet Personal Computer (PC) has been sharply increased. The smart phone or the tablet PC is an electronic device that integrates a calling function of a mobile communication terminal according to the related art and general functions of a computer, which has a relatively good portability and thus, demand for the smart phone or the tablet PC has been rapidly increased.

According to the related art, a smart phone or a tablet PC generally provides a user with a scheduler application. A scheduler application according to the related art is configured to include a calendar including year/month/day, and to enable a user to enter a schedule for a predetermined day. When a predetermined schedule is entered for the predetermined day, the smart phone or the tablet PC may inform a user of the predetermined schedule on the corresponding day. For example, the smart phone or the tablet PC may push a pop-up window for displaying the predetermined schedule so that a user may check the predetermined schedule.

Although the scheduler application according to the related art has the described reminder function, a user may be informed of the same only on the corresponding day and thus, may have difficulty in preparing in advance for the schedule.

A reminder application according to the related art operates based on time or place information. For example, a reminder application that operates based on the time information may be set to display a schedule at a time corresponding to the schedule. However, the reminder application displays the schedule only at the corresponding time as described above, which may be inconvenient for users.

The reminder application according to the related art may operate based on the place information. For example, a user may input, into the reminder application, a predetermined schedule and a place at which a reminder is to be performed. The reminder application may match location information input from the electronic device to the place at which a reminder is to be performed. When the electronic device is determined to be located in the place at which the reminder is to be performed as a result of matching, the reminder application may provide a user with the predetermined schedule. However, there is a high probability that matching between a name of a corresponding place and location information input from the electronic device, for example, a Global Positioning System (GPS) coordinate, has an error.

Accordingly, there is a desire for an electronic device that reminds of a task, which decreases a probability of occurrence of an error and provides a user with convenience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that reminds of a task that is linked with an application or another electronic device, and a controlling method thereof.

In accordance with an aspect of the present disclosure, a method of controlling an electronic device that provides a reminder of a task is provided. The method includes receiving an input of a content of a reminder target task, designating a related application that is linked with the reminder target task, and generating and storing the reminder target task of which the content is to be displayed using a predetermined event as a trigger.

In accordance with another aspect of the present disclosure, an electronic device that provides a reminder of a task is provided. The electronic device includes a touch screen configured to receive an input of a content of a reminder target task, and a controller configured to designate a related application that is linked with the reminder target task, and to generate and stores the reminder target task of which the content is to be displayed using a predetermined event as a trigger.

In accordance with another aspect of the present disclosure, a method of controlling an electronic device that performs a control so as to remind of a task in another device is provided. The method includes receiving an input of a content of a reminder target task, designating a related device that is linked with the reminder target task, generating the reminder target task of which the content is to be displayed using a predetermined event as a trigger, and transmitting the generated reminder target task to the related device.

In accordance with another aspect of the present disclosure, a method of controlling an electronic device that provides a reminder of a task is provided. The method includes receiving a reminder target task of which a content is to be displayed using a predetermined event as a trigger, and displaying the reminder target task when the predetermined event occurs.

In accordance with another aspect of the present disclosure, an electronic device that performs a control so as to remind of a task in another device is provided. The electronic device may include a touch screen configured to receive an input of a content of a reminder target task, a controller configured to designate a related device that is linked with the reminder target task, and to generate the reminder target task of which the content is to be displayed using a predetermined event as a trigger, and a communication unit configured to transmit the generated reminder target task to the related device.

In accordance with another aspect of the present disclosure, an electronic device that provides a reminder of a task is provided. The electronic device may include a communication unit configured to receive a reminder target task of which a content is to be displayed using a predetermined event as a trigger, and a controller configured to display the reminder target task when the predetermined event occurs.

According to various embodiments of the present disclosure, an electronic device that provides a reminder of a task that is linked with an application or another device and a controlling method thereof may be provided. When a user manipulates the electronic device to execute a predetermined application, the electronic device may remind of a task related to the corresponding application. The user may determine the task related to the corresponding application and may immediately start an operation in the executed application and thus, user's convenience may be improved or maximized.

According to various embodiments of the present disclosure, when a user manipulates another device that is predetermined, the other electronic device may also provide a reminder of a task related to the other electronic device. Even in a case in which the user uses an electronic device for a while, and then uses another electronic device, the user may check a previously entered scheduled and thus, user's convenience may be improved or maximized.

According to various embodiments of the present disclosure, a trigger for a task reminder may be determined by executing an application or manipulating an electronic device and thus, an error occurring in the above described reminder application according to the related art may be significantly reduced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
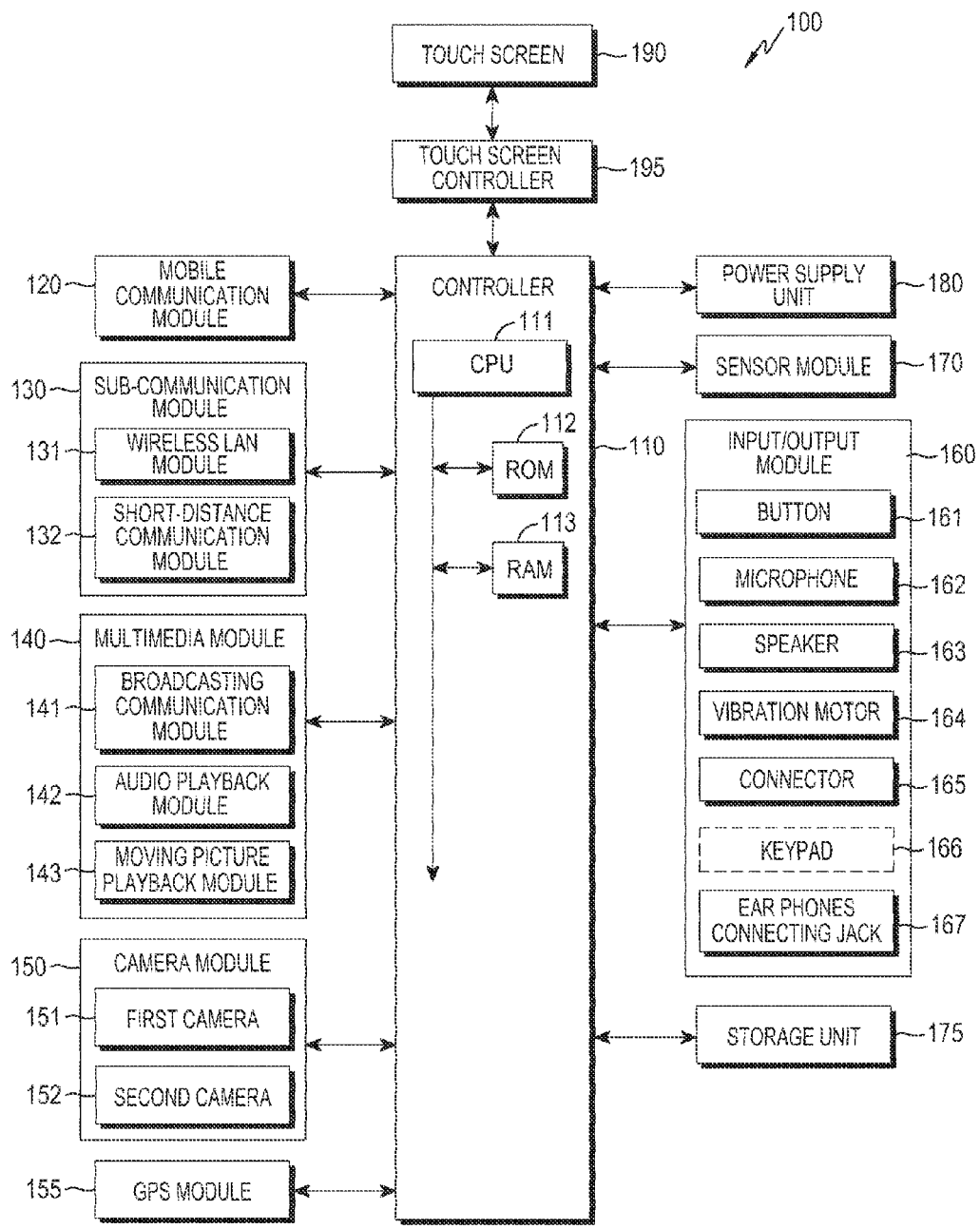
FIG. 1 is a schematic block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While terms including ordinal numbers, such as "first" and "second," and the like, may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more of the associated listed items.

The terms used in this application is for the purpose of describing particular various embodiments only and is not intended to be limiting of the disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As a non-exhaustive illustration only, an electronic device described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), a smart TV, an optical disc player, a set-top box, and the like capable of wireless communication or network communication consistent with that disclosed herein.

FIG. 1 is a schematic block diagram illustrating an electronic device according to an embodiment of the present disclosure.

Referring to FIG. 1, the electronic device 100 may include a controller 110, a mobile communication module 120, a sub-communication module 130, a multimedia module 140, a camera module 150, a GPS module 155, an input/output module 160, a sensor module 170, a storage unit 175, a power supply unit 180, a touch screen 190, and a touch screen controller 195.

The electronic device 100 may be connected to an external device (not illustrated) through an external device connecting part such as a sub-communication module 130, a connector 165, and an earphones connecting jack (not illustrated). The "external device" may include various devices that may be detachable from the electronic device 100 and may be wiredly connected to the electronic device 100, such as earphones, an external speaker, a Universal Serial Bus (USB) memory, a charging device, a cradle, a docking station, a DMB antenna, a payment device, a health care device (glucometer and the like), a game console, a navigation device for a vehicle, and the like. In addition, the "external device" may include a Bluetooth communication device, a short-distance communication device such as a Near Field Communication (NFC) device, a WiFi Direct communication device, and a radio Access Point (AP), which may be wirelessly connected to the electronic device 100 through a short-distance communication. The external device may include a different device, a portable terminal, a smart phone, a tablet PC, a desktop PC, and a server.

The sub-communication module 130 may include at least one of a wireless Local Area Network (LAN) module 131 and a short-distance communication module 132.

The multimedia module 140 may include at least one of a broadcasting communication module 141, an audio playback module 142, and a moving picture playback module 143.

The camera module 150 may include at least one of a first camera 151 and a second camera 152.

The input/output module 160 may include at least one of a button 161, a microphone 162, a speaker 163, a vibration motor 164, the connector 165, a key pad 166, and the earphones connecting jack 167.

The controller 110 may include a Central Processing Unit (CPU) 111, a Read-Only Memory (ROM) 112 that stores a control program for controlling the electronic device 100, and a Random-Access Memory (RAM) 113 that stores a signal or data input from the outside of the electronic device 100 or that is used as a memory region for an operation performed in the electronic device 100. The CPU 111 may include a various number of cores. For example, the CPU 111 may be a single-core CPU, a dual-core CPU, a triple-core CPU, a quad-core CPU, or the like. The CPU 111, the ROM 112, and the RAM 113 may be mutually connected through an internal bus.

The controller 110 may control the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195.

The mobile communication module 120 may connect the electronic device 100 to an external device through mobile communication, using at least one antenna or a plurality of antennas (not illustrated) based on a control of the controller 110. The mobile communication module 120 performs transmitting and receiving of a wireless signal for a voice call, a video call, a Short Message Service (SMS), or a Multimedia Message Service (MMS), with a portable phone (not illustrated), a smart phone (not illustrated), a tablet PC, or other devices (not illustrated), which have a phone number corresponding to a number input into the electronic device 100.

The sub-communication module 130 may include at least one of the wireless LAN module 131 and the short-distance communication module 132. For example, the sub-communication module 130 may include only the wireless LAN module 131, may include only the short-distance communication module 132, or may include both the wireless LAN module 131 and the short-distance communication module 132.

The wireless LAN module 131 may be connected to the Internet at a place at which a wireless AP (not illustrated) is installed, based on a control of the controller 110. The wireless LAN module 131 supports the wireless LAN standards (e.g., IEEE802.11x) of the Institute of Electrical and Electronic Engineers (IEEE). The short-distance communication module 132 may wirelessly perform short-distance communication between the electronic device 100 and another device such as, for example, an image forming device (not illustrated), based on a control of the controller 110. The short-distance communication scheme may include Bluetooth, Infrared Data Association (IrDA), WiFi-Direct communication, a Near Field Communication (NFC), and the like.

The electronic device 100 may include at least one of the mobile communication module 120, the wireless LAN module 131, and the short-distance communication module 132, depending on performance. In addition, depending on the performance, the electronic device 100 may include a combination of the mobile communication module 120, the wireless LAN module 131, and the short-distance communication module 132.

The multimedia module 140 may include the broadcasting communication module 141, the audio playback module 142, or the moving picture playback module 143. The broadcasting communication module 141 may receive a broadcasting signal (e.g., a TV broadcasting signal, a radio broadcasting signal, a data broadcasting signal, or the like) and broadcasting subsidiary information (e.g., an Electric Program Guide (EPS) or an Electric Service Guide (ESG)) transmitted from a broadcasting station, through a broadcasting communication antenna (not illustrated), based on a control of the controller 110. The audio playback module 142 may play back a stored or received digital audio file (of which a file extension is mp3, wma, ogg, way, or the like) based on a control of the controller 110. The moving picture playback module 143 may play back a stored or received digital moving picture file (of which a file extension is mpeg, mpg, mp4, avi, mov, mkv, or the like) based on a control of the controller 110. The moving picture playback module 143 may play back a digital audio file.

The multimedia module 140 may include the audio playback module 142 and the moving picture playback module 143, excluding the broadcasting communication module 141. In addition, the audio playback module 142 or the moving picture playback module 143 of the multimedia module 140 may be included in the controller 110.

The camera module 150 may include at least one of the first camera 151 and the second camera 152 that captures a still image or a moving picture based on a control of the controller 110. In addition, the first camera 151 or the second camera 152 may include an auxiliary light source (e.g., a flash (not illustrated)) that provides an amount of light required for capturing a subject. The first camera 151 may be disposed on a front side of the electronic device 100, and the second camera 152 may be disposed on a back side of the electronic device 100. As another example, the first camera 151 and the second camera 152 are disposed close to each other (e.g., a distance between the first camera 151 and the second camera 152 is greater than 1 cm and less than 8 cm) and thus, a three-dimensional (3D) still image or a 3D moving picture may be captured.

The GPS module 155 may receive an electric wave from a plurality of GPS satellites (not illustrated) in the Earth's orbit, and may calculate a location of the electronic device 100 based on a Time of Arrival (TOA) from a GPS satellite (not illustrated) to the electronic device 100.

The input/output module 160 may include at least one of a plurality of buttons 161, the microphone 162, the speaker 163, the vibration motor 164, the connector 165, the keypad 166, and the ear phones connecting jack 167.

The button 161 may be formed on a front side, a lateral side, or a back side of a housing of the electronic device 100, and may include at least one of a power button (not illustrated), a lock button (not illustrated), a volume button (not illustrated), a menu button, a home button, a back button, and a search button.

The microphone 162 may receive an input of a voice or a sound, and generates an electric signal, based on a control of the controller 110.

The speaker 163 may output, to the outside of the electronic device 100, a sound corresponding to a variety of signals (e.g., a wireless signal, a broadcasting signal, a digital audio file, a digital moving picture file, an image capturing signal, and the like) of the mobile communication module 120, the sub-communication module 130, the multimedia module 140, or the camera module 150. The speaker 163 may output a sound (e.g., a button manipulation sound corresponding to a phone call or a ring-back tone) corresponding to a function performed by the electronic device 100. One or a plurality of speakers 163 may be formed on an appropriate location or locations of the housing of the electronic device 100.

The vibration motor 164 may convert an electric signal into a mechanical vibration based on a control of the controller 110. For example, when the electronic device 100 in a vibration mode receives a voice call from another device (not illustrated), the vibration motor 164 may operate. One or a plurality of vibration motors 164 may be formed in the housing of the electronic device 100. The vibration motor 164 may operate in response to a touch motion of a user who touches the touch screen 190 formed in a touch screen or successive motions of a touch on the touch screen 190 formed in a touch screen.

The connector 165 may be used as an interface for connecting the electronic device 100 and an external device (not illustrated) or a power source (not illustrated). Based on a control of the controller 110, data stored in the storage unit 175 of the electronic device 100 may be transmitted to an external device (not illustrated) or data may be received from an external device (not illustrated) through a wired cable connected to the connector 165. In this example, the external device may be a docking station, and the data may be an input signal transferred from an external device, for example, a mouse, a keyboard, and the like. In addition, through the wired cable connected to the connector 165, the electronic device 100 may receive an input of power from a power source (not illustrated) or charge a battery (not illustrated) using the power source.

The keypad 166 may receive a key input from the user for controlling the electronic device 100. The keypad 166 includes a physical keypad (not illustrated) formed in the electronic device 100 or a virtual keypad (not illustrated) displayed on the touch screen 190 formed in a touch screen. The physical keypad (not illustrated) formed in the electronic device 100 may be excluded depending on the performance or a configuration of the electronic device 100.

Earphones (not illustrated) may be inserted into the earphone connecting jack 167 for connection with the electronic device 100.

The sensor module 170 may include at least one sensor that detects a state of the electronic device 100. For example, the sensor module 170 may include a proximity sensor to detect a proximity of the user to the electronic device 100, an illuminance sensor to detect an amount of light around the electronic device 100. In addition, the sensor module 170 may include a gyro sensor. The gyro sensor may detect a motion of the electronic device 100 (e.g., a rotation of the electronic device 100, an acceleration or vibration applied to the electronic device 100), may detect a point of the compass using the geomagnetic field, and may detect a direction of the gravity. In addition, the sensor module 170 may include an altimeter to detect an altitude by measuring the atmospheric pressure. The at least one sensor may detect the state, and may generate a signal corresponding to the detection so as to transmit the generated signal to the controller 110. The at least one sensor of the sensor module 170 may be added or removed depending on the performance of the electronic device 100.

The storage unit 175 may store a signal or data input/output to correspond to an operation of the mobile communication module 120, the sub-communication module 130, the multimedia module 140, the camera module 150, the GPS module 155, the input/output module 160, the sensor module 170, the touch screen 190, based on a control of the controller 110. The storage unit 175 may store a control program and an application for controlling the electronic device 100 or the controller 110.

The term "storage unit" may include the storage unit 175, the ROM 112 and the RAM 113 included in the controller 110, or a memory card (not illustrated) (e.g., an SD card and a memory stick) contained in the electronic device 100. The storage unit may include a non-volatile memory, a volatile memory, a Hard Disk Drive (HDD), or a Solid State Drive (SSD).

The power supply unit 180 may supply power to one battery or a plurality of batteries (not illustrated) disposed on the housing of the electronic device 100, based on a control of the controller 110. One or a plurality of batteries (not illustrated) supplies power to the electronic device 100. In addition, the power supply unit 180 may supply, to the electronic device 100, power input from an external power source (not illustrated) through the wired cable connected to the connector 165. In addition, the power supply unit 180 supplies, to the electronic device 100, power wirelessly input from the external power source through a wireless charging technology.

The touch screen 190 may include a touch screen. The touch screen 190 may provide a user with user interfaces corresponding to various services (e.g., calling, data transmission, broadcasting, and image capturing). The touch screen 190 may transmit, to the touch screen controller 195, an analog signal corresponding to at least one touch input on a user interface. The touch screen 190 may receive an input of at least one touch through a body part of the user (e.g., a finger including a thumb) or a touch input unit (e.g., a stylus pen). In addition, the touch screen 190 may receive an input of successive motions of one touch from among the at least one touch. The touch screen 190 may transmit, to the touch screen controller 195, an analog signal corresponding to the successive motions of the input touch.

According to various embodiments of the present disclosure, the touch may not be limited to a contact between the touch screen 190 and a body part of the user or a touch input unit, and may include a non-contact. The detectable distance that may be detected by the touch screen 190 may be changed based on the performance or a configuration of the electronic device 100.

The touch screen 190 may be embodied based on varied schemes, for example, a resistive scheme, a capacitive scheme, an Electronic Magnetic Resonance (EMR) scheme, an infrared scheme, an acoustic wave scheme, or the like, or may be embodied based on a combination thereof.

The touch screen controller 195 may convert an analog signal received from the touch screen 190 into a digital signal (e.g., X and Y coordinates), and transmits the digital signal to the controller 110. The controller 110 may control the touch screen 190 using the digital signal received from the controller 195. For example, the controller 110 may perform a control to select or to execute a shortcut icon (not illustrated) displayed on the touch screen 190, in response to a touch. In addition, the touch screen controller 195 may be included in the controller 110.

Figure 2A:
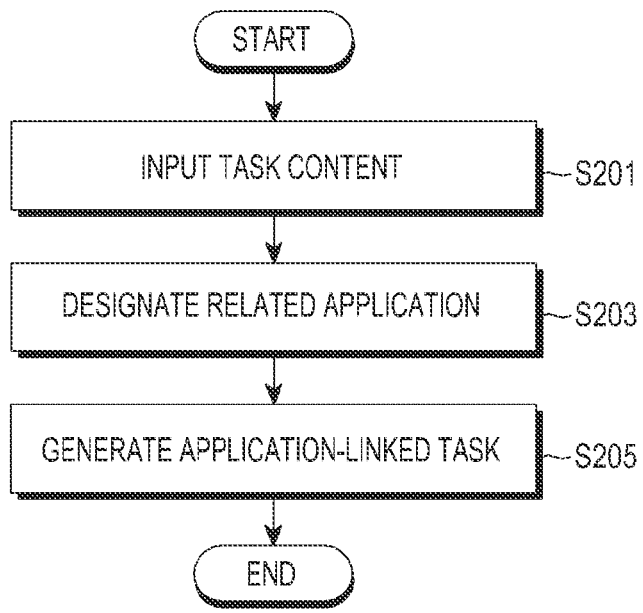
FIG. 2A is a flowchart illustrating a method of generating an application-linked task according to an embodiment of the present disclosure.
Figure 2B:
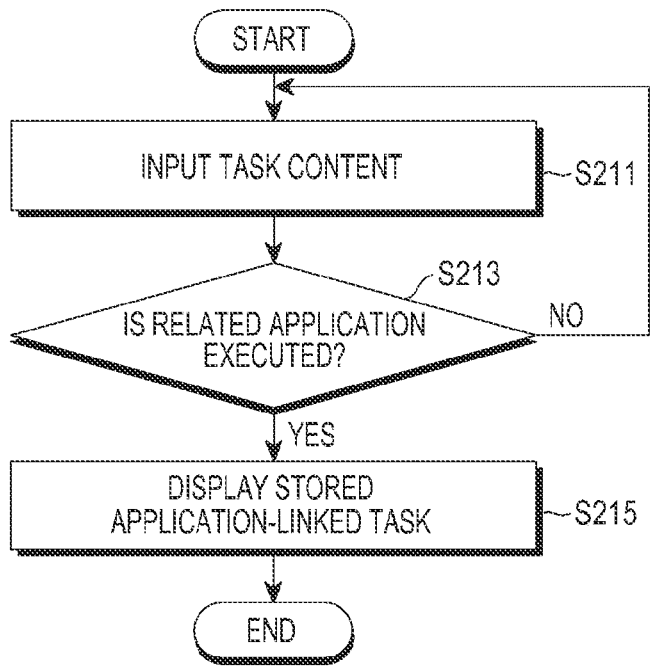
FIGS. 2B and 2C are flowcharts illustrating a method of displaying an application-linked task according to an embodiment of the present disclosure.
Figure 2C:
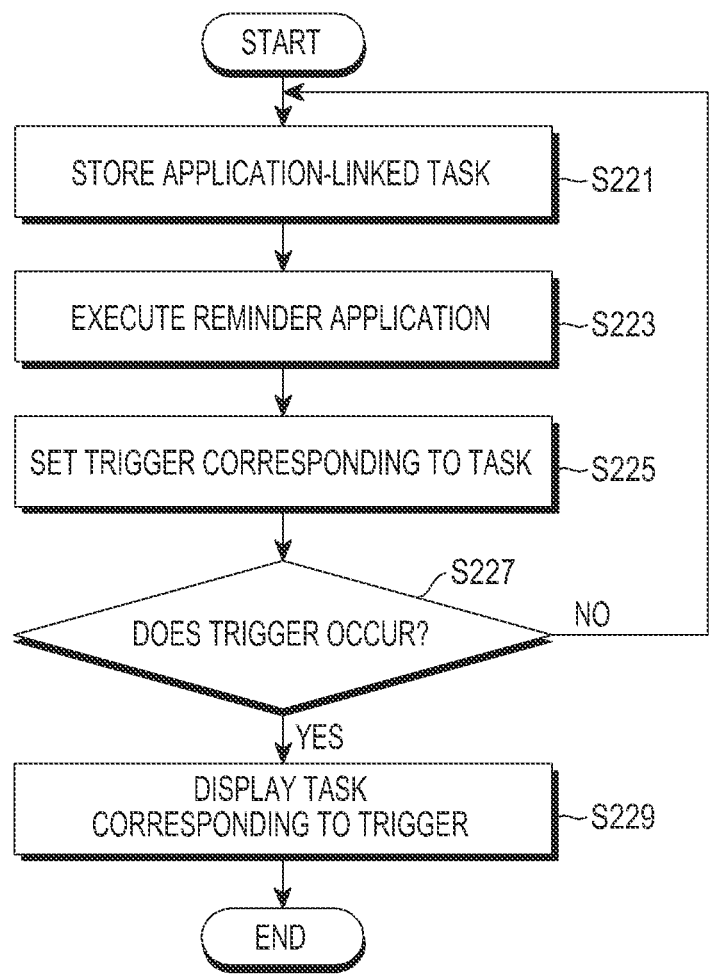

FIG. 2A is a flowchart illustrating a method of generating an application-linked task according to an embodiment of the present disclosure. FIGS. 2B and 2C are flowcharts illustrating a method of displaying an application-linked task according to an embodiment of the present disclosure. FIGS. 2A, 2B, and 2C will be described in detail with reference to FIGS. 3A through 3E. FIGS. 3A, 3B, 3C, 3D, and 3E are conceptual diagrams illustrating an electronic device according to various embodiments of the present disclosure.

First, referring to FIG. 2A, at operation S201, the electronic device 100 may receive an input of a task content. A task may include at least one task content and at least one of a related application type and a related device. In addition, the task content may include a variety of content, such as a task title, a content of a task, a task date, a place of a task, and the like.

Figure 3A:
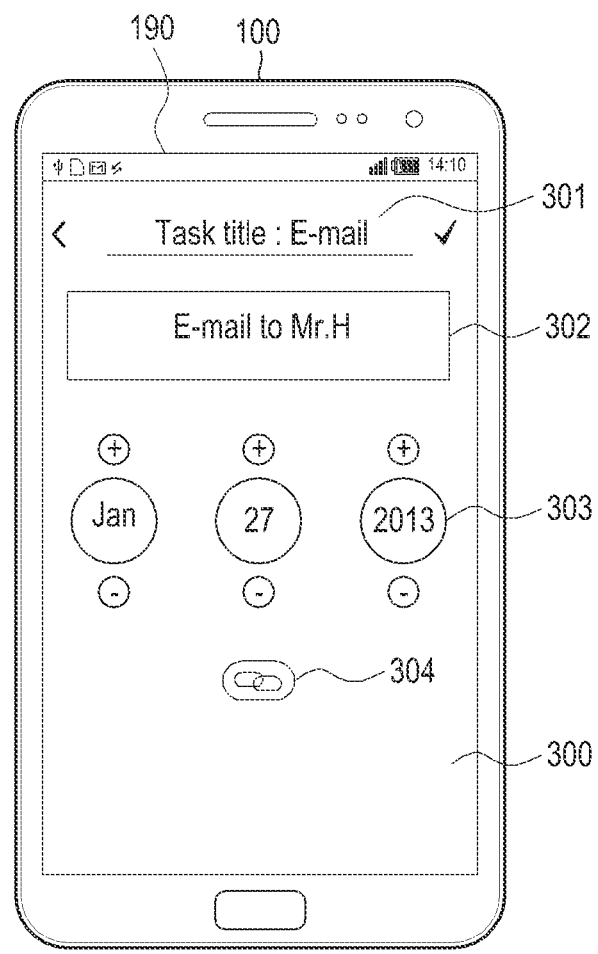
FIGS. 3A, 3B, 3C, 3D, 3E, and 3F are conceptual diagrams illustrating an electronic device according to various embodiments of the present disclosure.

For example, as illustrated in FIG. 3A, the electronic device 100 may display a task generating User Interface (UI) 300 on the touch screen 190. The electronic device 100 may execute a reminder application for generating a task, first. The task generating UI 300 may be a type of execution screen of a reminder application. The task generating UI 300 may include a window 301 for inputting a task title, a window 302 for inputting a content of a task, a task date 303, and a related application designating button 304.

A title of a corresponding task may be input into the window 301 for a title of a task. For example, the electronic device 100 may display a keypad for inputting a title of a task, and may receive an input of a title of a task from a user through manipulating the keypad. According to various embodiments of the present disclosure such as the example illustrated in FIG. 3A, the electronic device 100 may receive and display a task title of "E-mail". A content of a corresponding task may be input into the window 302 for a content of a task. For example, as illustrated in FIG. 3A, the electronic device 100 may receive an input of a content of a task of "E-mail to Mr. H". A date of a corresponding task may be input into the task date 303. For example, as illustrated in FIG. 3A, the task date 303 may include a year/month/day displaying window and a year/month/day adjusting button. A user may manipulate the year/month/day adjusting button so as to change the task date 303.

The related-application designating button 304 may provide a function of designating an application linked with a generated task.

Figure 3B:
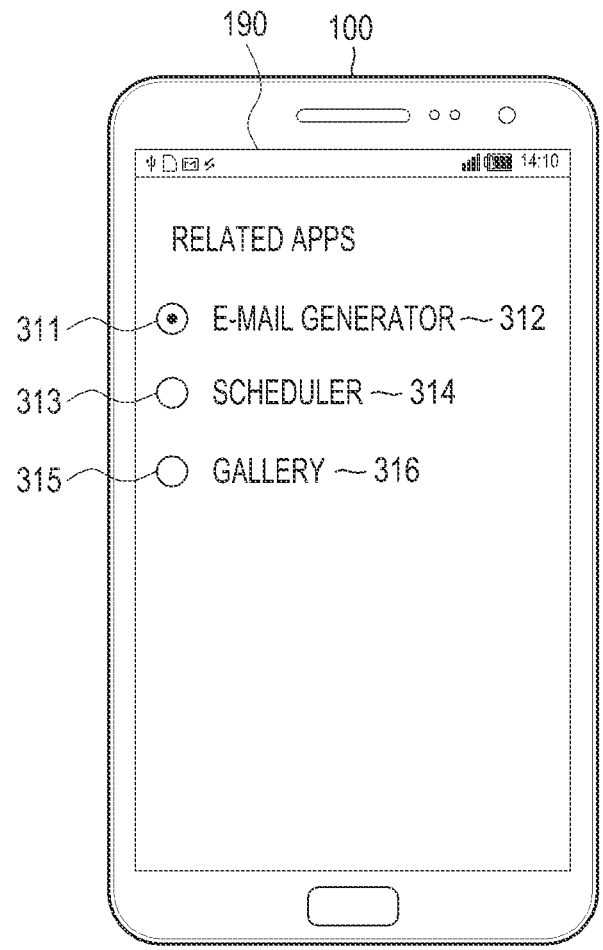

When the electronic device 100 may receive a task content at operation S201, the electronic device 100 proceeds to operation S203 at which the electronic device may receive a designation of a related application. For example, when the related application designating button 304 of FIG. 3A is designated, the controller 110 may control the touch screen 190 to display a related application list as illustrated in FIG. 3B. The controller 110 may determine an application list stored in the storage unit 175, and may perform a control to display the application list. The controller 110 may perform a control to display all of applications stored in the storage unit 175. In addition, the controller 110 may perform a control to display only an application that provides a reminder function from among the stored applications. The application that provides a reminder function may include the function by a producer. The controller 110 may set an application to provide a reminder function although it is a $3^{rd}$ party application, which will be described in detail later.

Although it is described that the electronic device 100 may receive a designation of a related application, such a description is merely an example. For example, the electronic device 100 may designate a related application based on a content of a task content. As illustrated in FIG. 3A, when the input of the task title 301 of E-mail is received, the controller 110 may designate an E-mail generator as a related application.

The controller 110 may perform a control to display related application designating windows 311, 313, and 316 and related application identifiers 312, 314, and 316, as illustrated in FIG. 3B. The related application identifiers 312, 314, and 316 may be names of applications. Although not illustrated, the related application identifiers 312, 314, and 316 may be replaced with icons, thumbnails, and the like for displaying.

The controller 110 may determine a designated related application from among the related application designating windows 311, 313, and 316 to be a related application to be linked with a task. According to the example illustrated in FIG. 3B, the controller 110 may determine an E-mail generator as a related application to be linked with a task.

At operation S205, the controller 110 may generate an application-linked task based on at least one of a input task content and a designated related application. The controller 110 may store the generated application-linked task, and performs a control to display or to not display the same. The application-linked task may provide an input task content using a predetermined event as a trigger. For example, the application-linked task may provide an input task content using execution of a predetermined application as a trigger. As described above, an electronic device that reminds of a task that is different from a time or space information-based reminder application according to the related art, and a controlling method thereof may be provided. A screen displayed in FIG. 3A may be an individual frame work that may be linked with other applications, as opposed to a screen embodied by a single application.

FIG. 2B is a flowchart illustrating a method of displaying an application-linked task according to an embodiment of the present disclosure.

Referring to FIG. 2B, the electronic device 100 may store the application-linked task generated through the process of FIG. 2A. For example, at operation S211, the electronic device 100 may receive an input of a task content. The electronic device 100 may monitor execution of a trigger for the application-linked task.

For example, at operation S213, the electronic device 100 may determine whether a related application is executed. For example, a task manager may be defined in a framework of an Operating System (OS) of the electronic device 100. The task manager may manage execution and termination of an application, and the controller 110 may determine whether a related application is executed based on management items of the task manager. The description provided in association with determining by the controller 110 whether the related application is executed is merely an example, and those skilled in the art may readily understand that the scope of the right of the present disclosure may not be limited by determining whether the related application is executed.

Figure 3C:
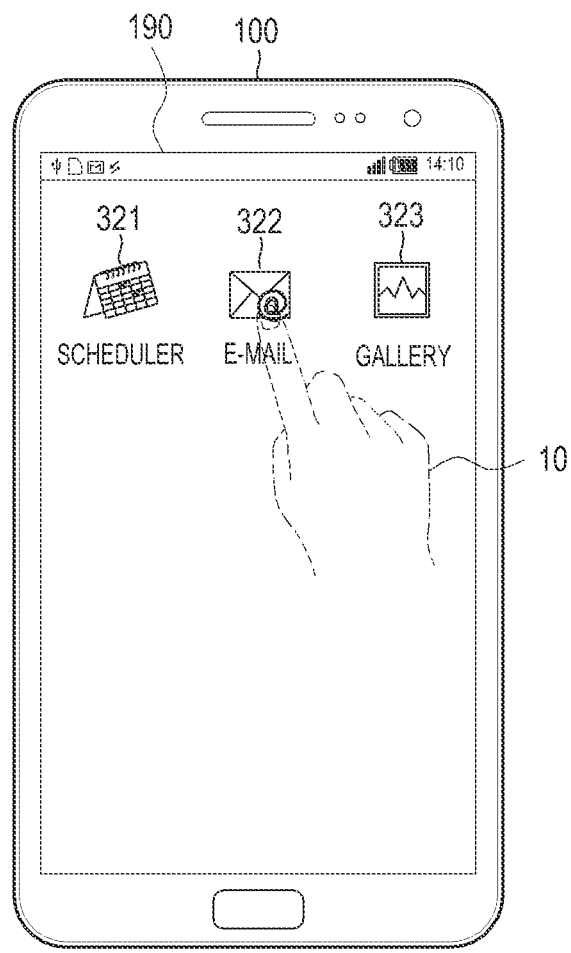

For example, as illustrated in FIG. 3C, the electronic device 100 may display a launcher or an application menu screen including at least one application execution icons 321, 322, and 323. A user 10 may execute an application by designating one application execution icon from a launcher screen. It is assumed that an E-mail generator is set to be a related application, for an application-linked task that the electronic device 100 stores in FIG. 3C.

If the electronic device 100 determines that a related application is not executed at operation S213, then the electronic device may return to operation S211.

Figure 3D:
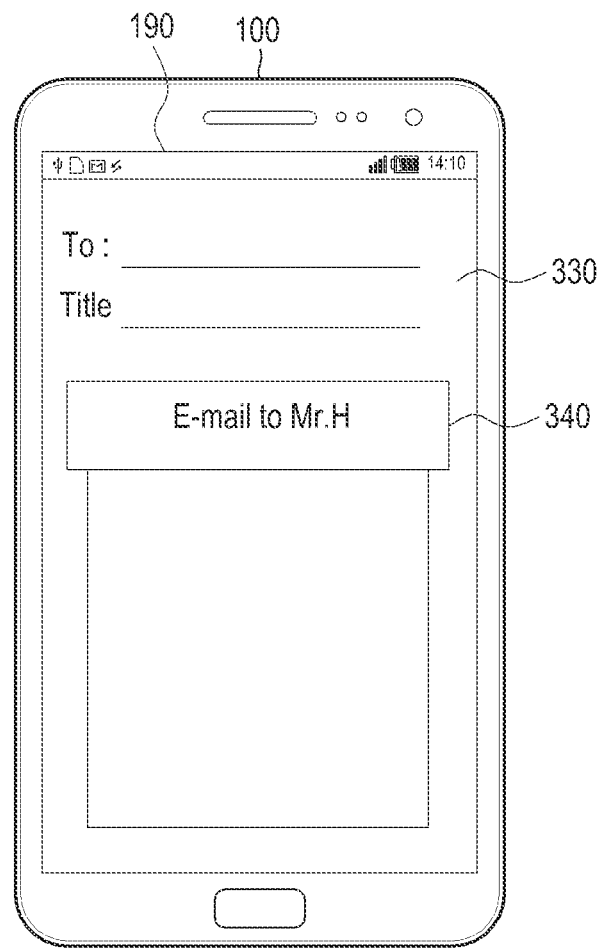

When the electronic device 100 may determine that the related application is executed at operation S213, the electronic device 100 proceeds to operation S215 at which the controller 110 may perform a control to display a stored application-linked task. For example, as illustrated in FIG. 3D, the controller 110 may display an execution screen 330 of the E-mail generator for which an execution command is input as shown in FIG. 3C. In addition, the controller 110 may display a stored application-linked task display window 340. The application-linked task display window 340 may include a content of a task. Although not illustrated, the application-linked task display window 340 may further include a task title, a task date, and the like. As illustrated in FIG. 3D, the controller 110 may display the application-linked task display window 340 together with the application execution screen 330. An application producer may produce an application to display the application-linked task display window 340 together with the application execution screen 330.

As described above, even in a case in which a $3^{rd}$ party application producer produces an application to not display the application-linked task display window 340, the controller 110 may display the application-linked task display window 340 to cover the application execution screen 330. For example, the controller 110 may perform a control to generate a view of the application-linked task display window 340 and to display the application-linked task display window 340 on the application execution screen 330.

Figure 3E:
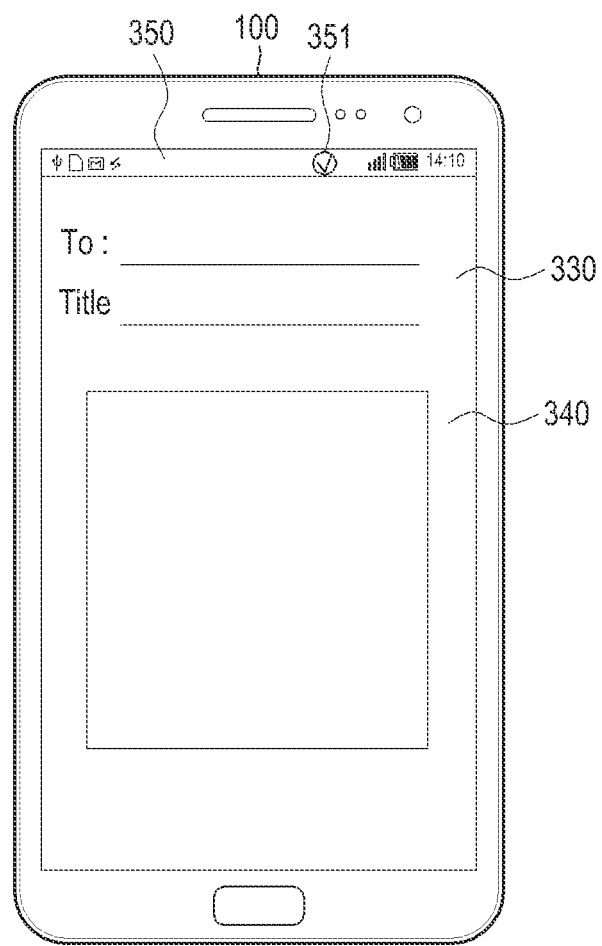
Figure 3F:
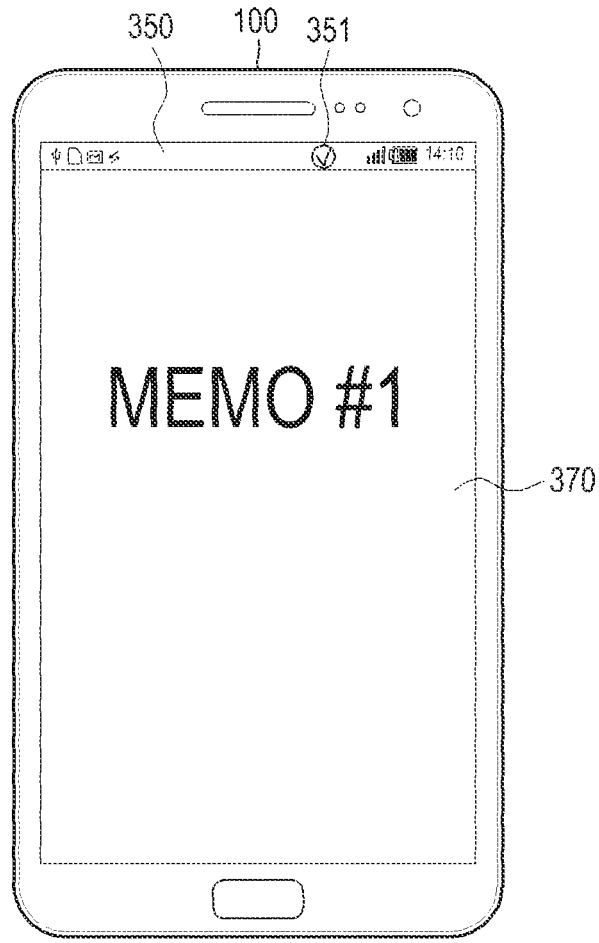

As another example, as illustrated in FIG. 3E, the controller 110 may perform a control to display a task shortcut key 351 on an area 350 independent from the application execution screen 330. The area 350 independent from the application execution screen 330 is an area that is managed, in a framework, independently from the application execution screen 330. For example, a residual quantity of a battery, a date, time, a communication environment state, and the like may be displayed. The controller 110 may perform a control to display the task shortcut key 351 in the area 350 independent from the application execution screen 330. Accordingly, although the $3^{rd}$ party application producer does not produce the application-linked task display window 340, an existence (or status) of a task may be displayed. For example, as illustrated in FIG. 3F, the task shortcut key 351 may be displayed in the area 350 independent from a $3^{rd}$ party developed application execution screen 370 as illustrated in FIG. 3E, and a task may be displayed when the task shortcut key 351 is designated.

When the task shortcut key 351 is designated, the controller 110 may perform a control to display the application-linked task display window 340 as illustrated in FIG. 3D.

FIG. 2C is a flowchart illustrating a method of controlling the electronic device 100 according to an embodiment of the present disclosure.

Referring to FIG. 2C, the electronic device 100 may store an application-linked task in operation S221. The application-linked task may include at least one of a task content and related application information.

At operation S223, the controller 110 may execute a reminder application. According to various embodiments of the present disclosure, the controller 110 may not display a reminder application.

At operation S225, the controller 110 may set a trigger corresponding to a task.

At operation S227, the controller 100 may monitor whether a trigger occurs.

When the controller 100 determines that a trigger occurs in operation S227, the controller 110 proceeds to operation S229 at which the controller 110 may perform a control to display an application-linked task corresponding to the trigger.

In contrast, if the controller 110 determines that the trigger does not occur at operation S227, the controller 110 may return to operation S221.

Figure 4A:
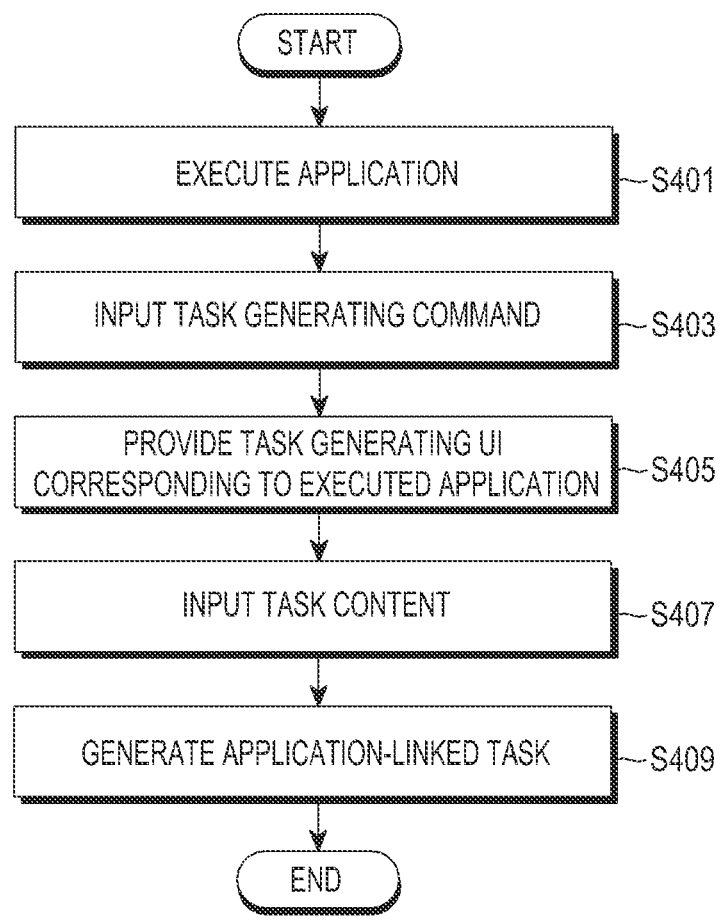
FIG. 4A is a flowchart illustrating a method of controlling an electronic device according to an embodiment of the present disclosure.
Figure 5A:
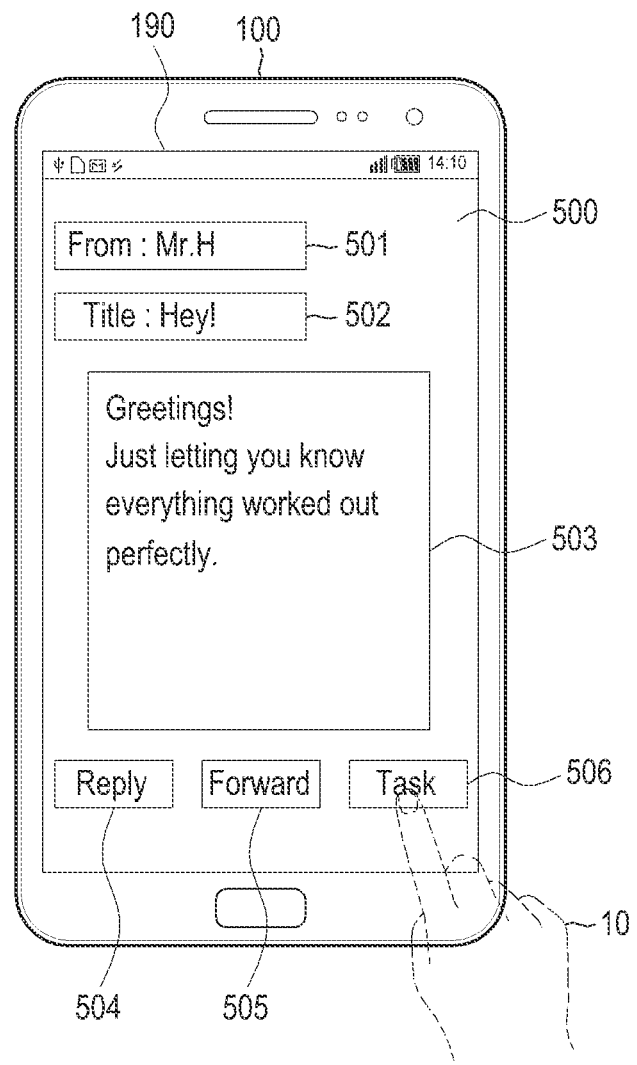
FIGS. 5A and 5B are conceptual diagrams illustrating an electronic device according to various embodiments of the present disclosure.
Figure 5B:
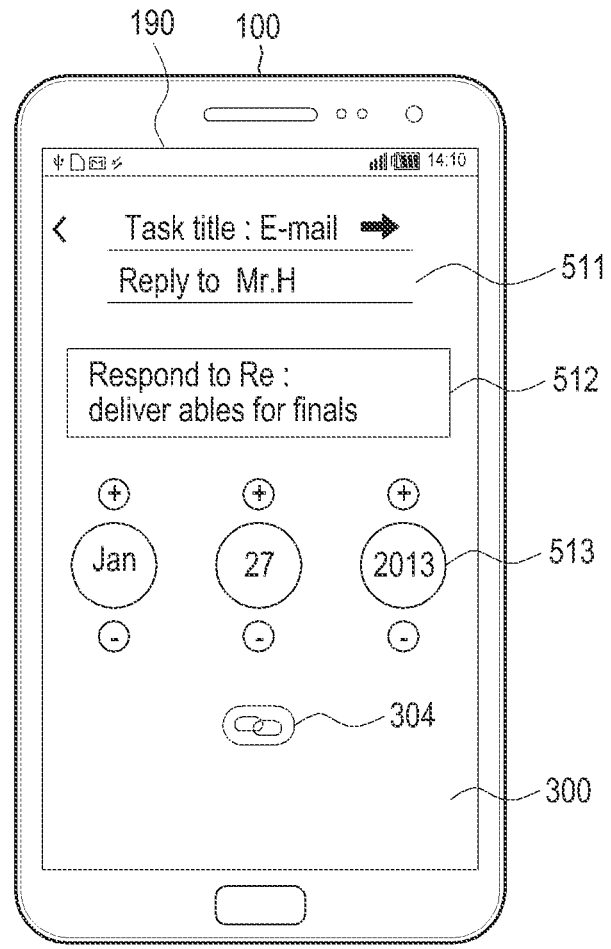

FIG. 4A is a flowchart illustrating a method of controlling an electronic device according to an embodiment of the present disclosure. The controlling method of FIG. 4A will be described in detail with reference to FIGS. 5A and 5B. FIGS. 5A and 5B are conceptual diagrams illustrating an electronic device according to various embodiments of the present disclosure.

Referring to FIG. 4, the controller 110 may execute an application at operation S401. The controller 110 may execute, for example, an E-mail generator, as illustrated in FIG. 5A. The controller 110 may perform a control to display an E-mail generator application execution screen 500 on the touch screen 190. The E-mail generator application execution screen 500 may include a sender 501, an E-mail title 502, an E-mail content 503, a reply button 504, a forward button 505, and a task generating button 506.

For example, an application illustrated in FIG. 5A may include the task generating button 506, and may generate a task during an application execution process.

At operation S403, the user 10 may designate the task generating button 506 and input a task generating command.

At operation S405, the controller 110 may perform a control to execute a reminder application, and to provide a task generating UI corresponding to the executed application. For example, as illustrated in FIG. 5B, a task generating UI 300 may be displayed. The task generating UI 300 may include a task title 511, a content of a task 512, a task date 513, and the related application designating button 304.

The controller 110 may perform a control to enter "E-mail" in the task title 511. The controller 110 may determine that an E-mail generator is executed in FIG. 5A, and accordingly, may perform a control to enter "E-mail" in the task title 511 for displaying. For example, the controller 110 may perform a control to provide a task generating UI corresponding to the application being executed.

At operation S407, the electronic device 100 may receive an input of a task content through the touch screen 190.

At operation S409, the controller 110 may generate an application-linked task.

Figure 4B:
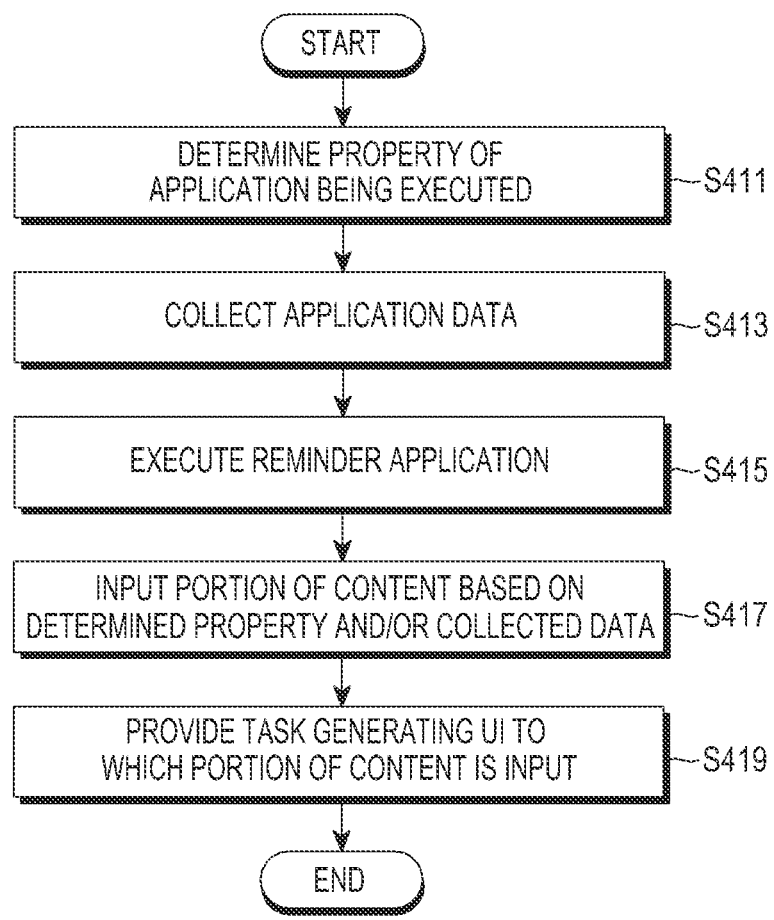
FIG. 4B is a flowchart illustrating an operation of providing a task generating User Interface (UI) corresponding to an application being executed of a method of controlling an electronic device such as, for example, the method of FIG. 4A according to an embodiment of the present disclosure.

FIG. 4B is a flowchart illustrating an operation of providing a task generating UI corresponding to the application being executed of a method of controlling an electronic device such as, for example, the method of FIG. 4A according to an embodiment of the present disclosure.

Referring to FIG. 4B, at operation S411, the controller 110 determines a property of the application being executed. The controller 110 may determine that the application being executed is, for example, an E-mail generator.

At operation S413, the controller 110 may collect data of the application. For example, the controller 110 may collect the data of the application indicating that a sender of the E-mail is Mr. H.

At operation 415, the controller 110 may execute a reminder application.

At operation S417, the controller 110 may input a portion of a content based on at least one of the determined property and the collected data. For example, the controller 110 may perform a control to enter "E-mail=>Reply to Mr. H" to the task title based on the application data indicating that the sender of the E-mail is Mr. H and the property of the application being executed is the E-mail generator.

At operation S419, the controller 110 may perform a control to provide a task generating UI to which a portion of a content is input.

As described above, the electronic device 100 may generate a task even in a case in which an application is being executed. A user may manipulate the electronic device 100 to readily generate a task for a reminder while an application is executed and thus, a user's convenience may be maximized.

Figure 4C:
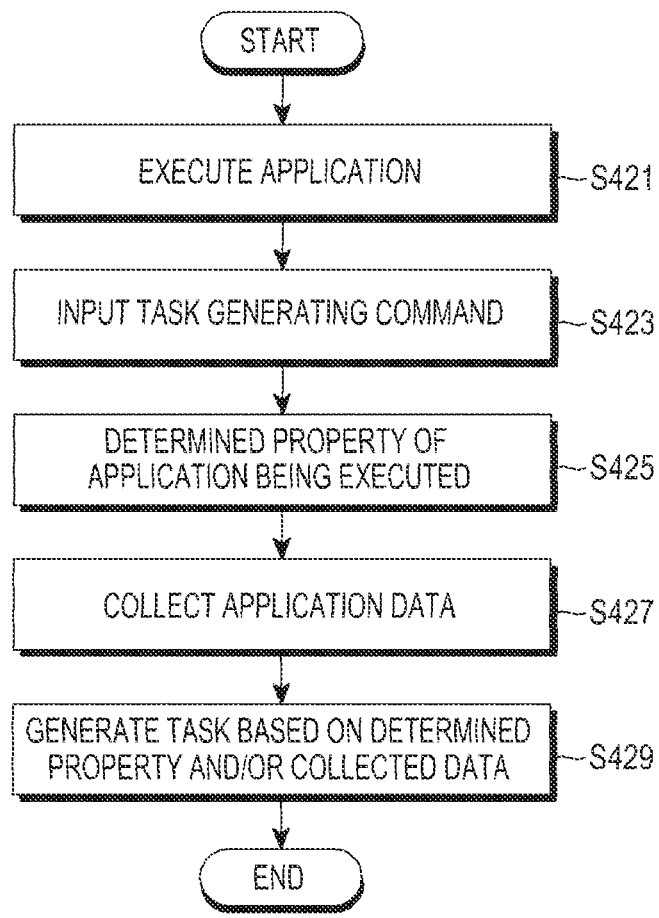
FIG. 4C is a flowchart illustrating a method of controlling an electronic device according to an embodiment of the present disclosure.

FIG. 4C is a flowchart illustrating a method of controlling an electronic device according to another embodiment of the present disclosure. The controlling method of FIG. 4C will be described in detail with reference to FIGS. 6A, 6B, 6C, and 6D. FIGS. 6A, 6B, 6C, and 6D are conceptual diagrams illustrating the electronic device 100 according to various embodiments of the present disclosure.

Figure 6A:
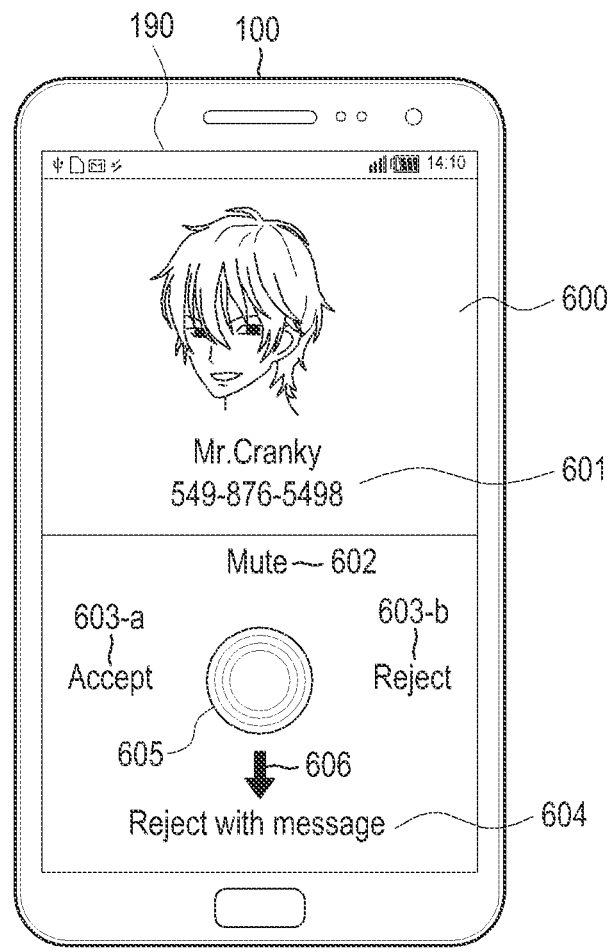
FIGS. 6A, 6B, 6C, and 6D are conceptual diagrams illustrating an electronic device according to various embodiments of the present disclosure.

At operation S421, the controller 110 may execute an application. For example, as illustrated in FIG. 6A, the controller 110 may execute a phone application 600. The controller 110 may establish a call with another electronic device, and may execute the phone application 600 corresponding to the call. An execution screen of the phone application 600 may include caller information 601 and a phone process function area 602,603-a, 603-b, 604, and 605.

Figure 6B:
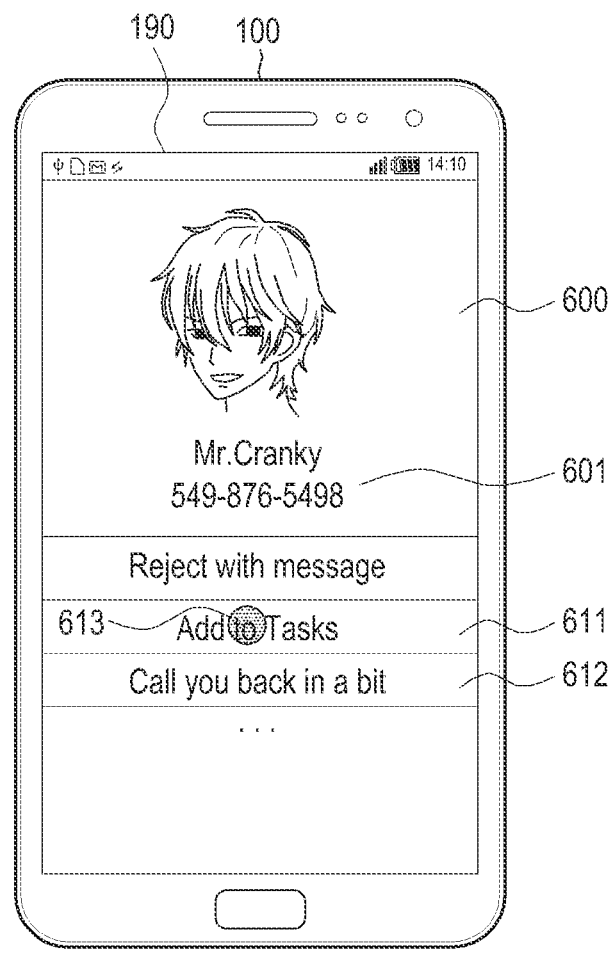

At operation S423, the electronic device 100 may receive an input of a task generating command. For example, as illustrated in FIG. 6A, when an input 606 to a phone refusal process function key 604 is received, the controller 110 may perform a control to display a phone refusal process screen as illustrated in FIG. 6B. In addition, the controller 110 may further display a task generating button 611 and a message transmitting button 612.

At operation S423, the user may provide a designation 613 of the task generating button 611, and accordingly, may input a task generating command to the electronic device 100.

When the input of the task generating command is received at operation S423, the controller 110 may proceed to operation S425 at which the controller 110 may determine a property of an application being executed. For example, in the embodiment of the present disclosure illustrated in FIG. 6B, the controller 110 may determine that the application being executed is a phone application.

At operation S427, the controller 110 may collect data from the application being executed. For example, in the various embodiments of the present disclosure illustrated in FIGS. 6A and 6B, the controller 110 may collect data indicating that a call setup request is received from Mr. Cranky.

At operation S429, the controller 110 may generate a task based on at least one of determined property and the collected data.

Figure 6C:
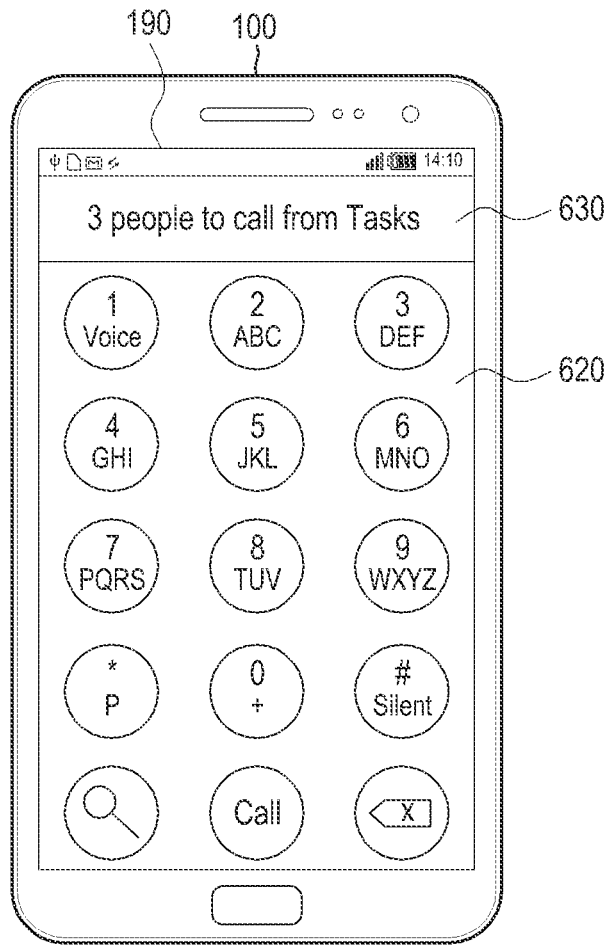
Figure 6D:
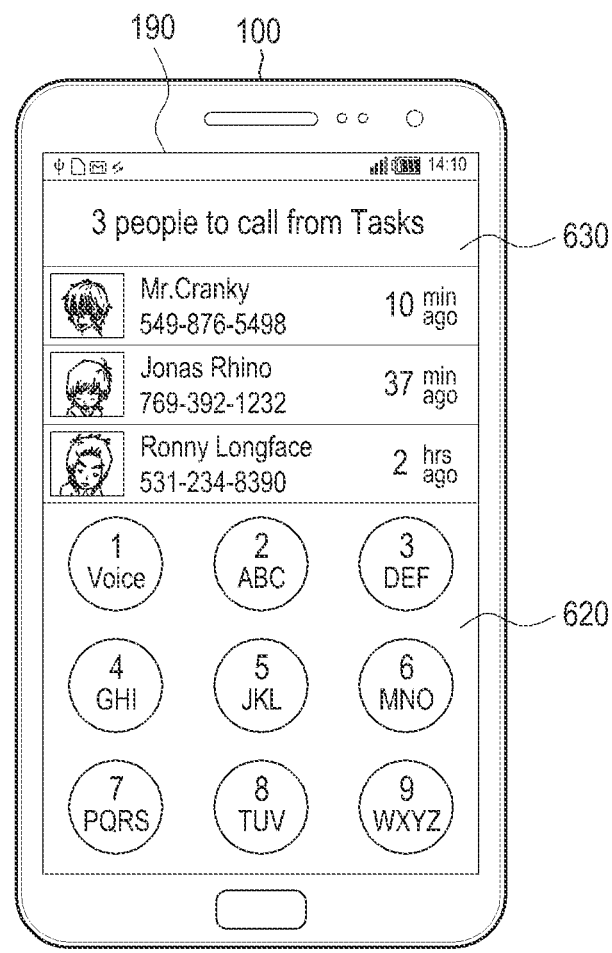

Subsequently, when the phone application is executed as illustrated FIG. 6C, the controller 110 may perform a control to provide an application execution screen 620 and to display a task 630 together with the application execution screen 620. As illustrated in FIGS. 6C and 6D, the controller 110 may perform to control to display a task 630 including a plurality of items or a plurality of tasks. For example, a user may manipulate the task 630 illustrated in FIG. 6C to expand the task 630 and display the identified tasks as illustrated in FIG. 6D.

As described above, a task may be generated even though a task content is not input from a user. Accordingly, in a case in which a user does not have enough time to answer a call, the user may readily manipulate the electronic device to promptly generate a task and thus, the user's convenience may be maximized.

Figure 7A:
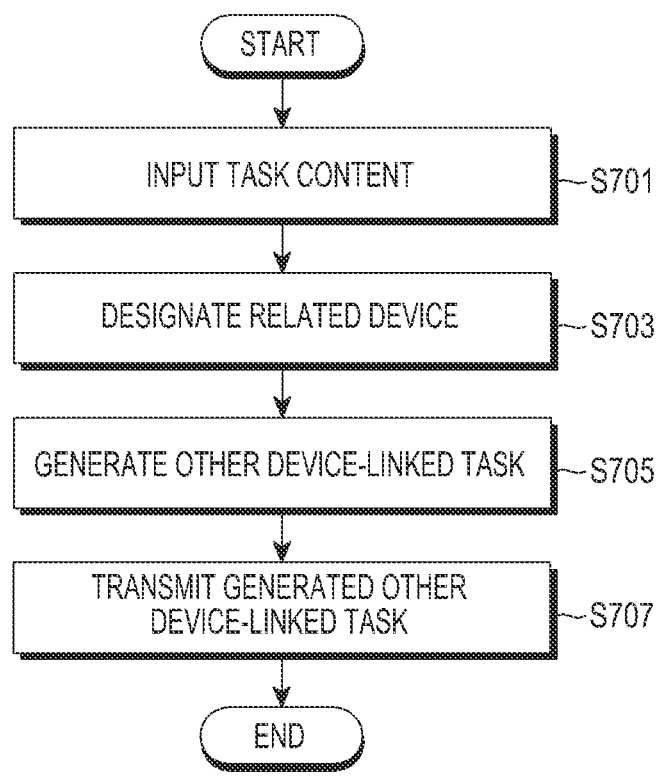
FIGS. 7A and 7B are flowcharts illustrating generation and display of a task linked with another device according to an embodiment of the present disclosure.
Figure 7B:
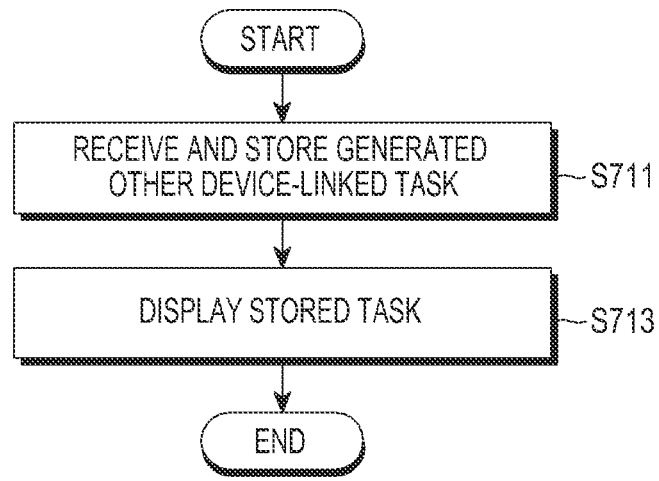

FIGS. 7A and 7B are flowcharts illustrating generation and display of a task linked with another device according to an embodiment of the present disclosure. FIGS. 7A and 7B will be described in detail with reference to FIGS. 8A, 8B, 8C, and 8D. FIGS. 8A, 8B, 8C, and 8D are conceptual diagrams of an electronic device according to various embodiments of the present disclosure.

First, referring to FIG. 7A, at operation S701, the electronic device 100 may receive an input of a task content. For example, as illustrated in FIG. 8A, the electronic device 100 may display the task generating UI 300 on the touch screen 190.

Figure 8A:
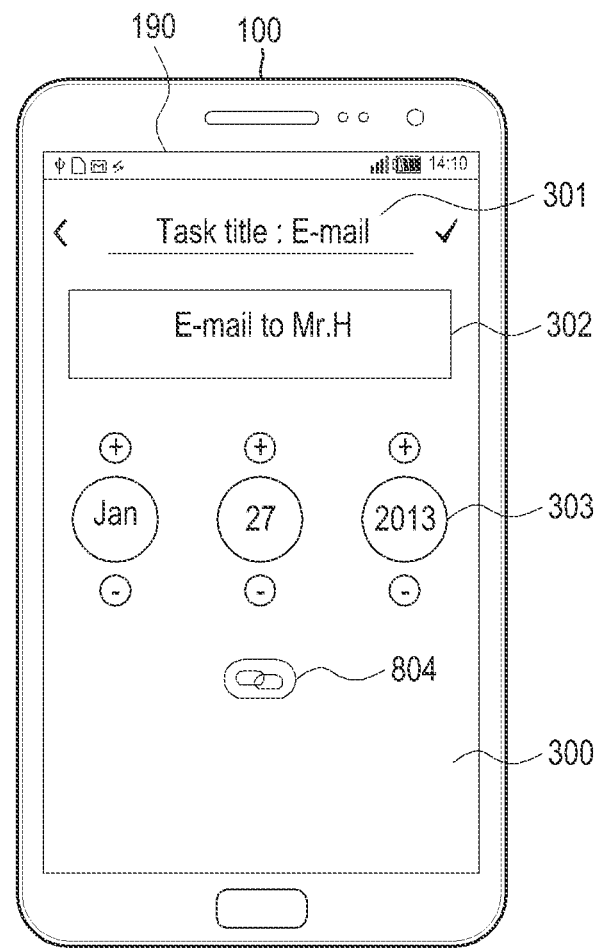
FIGS. 8A, 8B, 8C, and 8D are conceptual diagrams of an electronic device according to various embodiments of the present disclosure.

According to various embodiments of the present disclosure such as in the example illustrated in FIG. 8A, the electronic device 100 may receive an input of a task title of "E-mail", and may display the same. The task title may be input into a window 301 for inputting a task title. A content of a corresponding task may be entered in the window 302 for a content of a task. For example, in the example illustrated in FIG. 8A, the electronic device 100 may receive an input of the task content of "E-mail to Mr. H". A data of the corresponding task may be entered into the task date 303. For example, in the example illustrated in FIG. 8A, the task date 303 may include a year/month/day display window and a year/month/day adjusting button. A user may change the task date 303 by adjusting the year/month/day button.

A related device designating button 804 may provide a function of designating an application that is linked with the generated task.

Figure 8B:
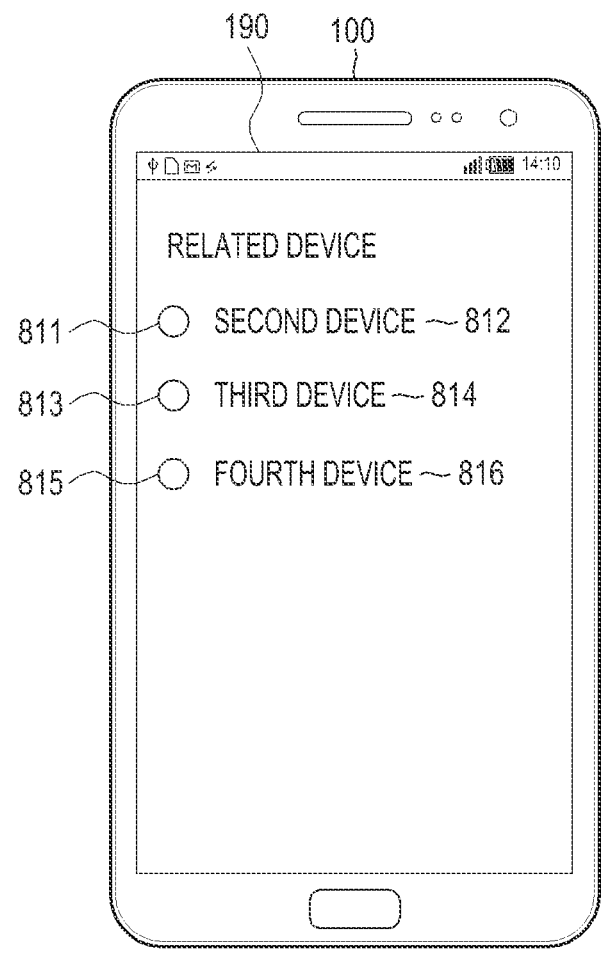

When the electronic device 100 receives the input of the task content at operation S701, the electronic device 100 may proceed to operation S703 at which the electronic device 100 may receive a designation of a related device. For example, when a related device designating button 804 of FIG. 8A is designated, the controller 110 may control the touch screen 190 to display a related device list as illustrated in FIG. 8B. The controller 110 may determine the related device list stored in the storage unit 175, and may perform a control to display the same.

Referring to FIG. 8B, the controller 110 may perform a control to display related device designating windows 811, 813, and 815, and related device identifiers 812, 814, and 816. The related device identifiers 812, 814, and 816 may be names of the devices. Although not illustrated, the related device identifiers 812, 814, and 816 may be replaced with icons, thumbnails, and the like for displaying.

The controller 110 may determine a related device designated from among the related device designating windows 811, 813, and 816 to be a related device to be linked with the task. In FIG. 8B, the controller 110 may determine a second device 800 to be the related device to be linked with the task.

At operation S705, the controller 110 may generate a device-linked task based on at least one of the input task content and the designated related device. The controller 110 may store the generated device-linked task.

Figure 8C:
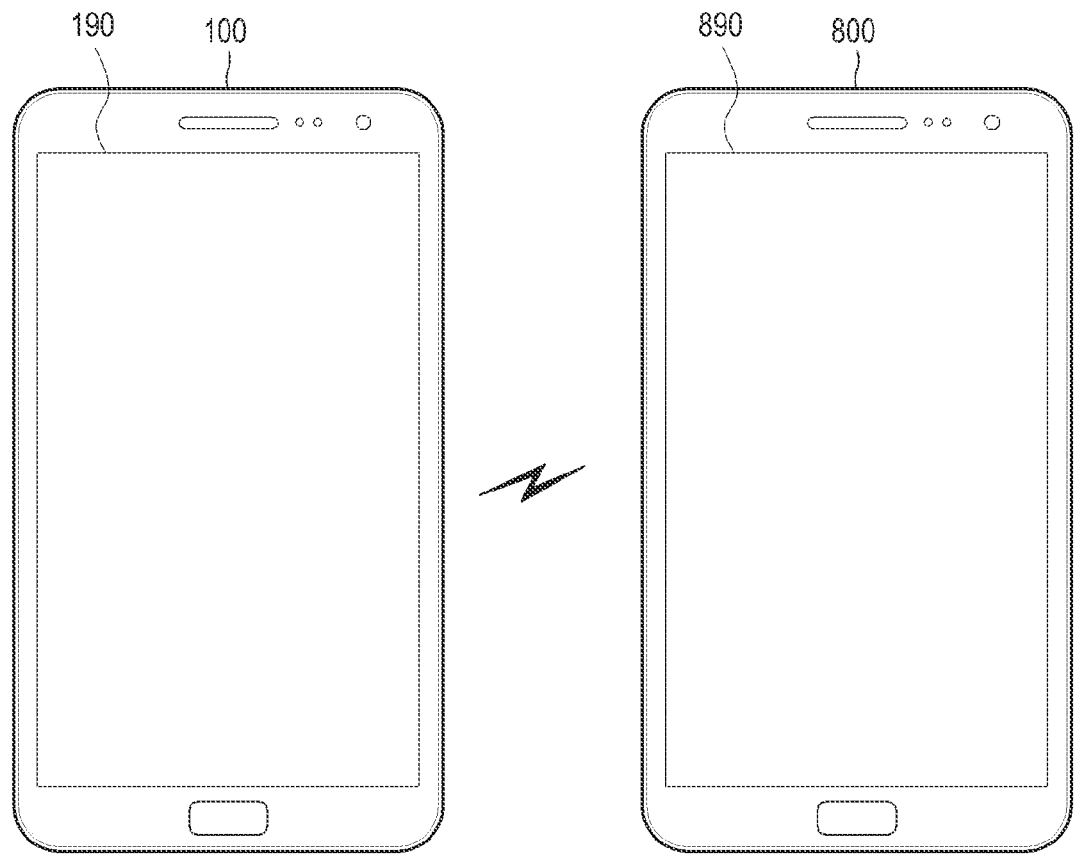

At operation S707, the controller 110 may transmit the generated device-linked task to another device, for example, the related device 800, as illustrated in FIG. 8C.

The device-linked task may provide an input task content using a predetermined event as a trigger. For example, the device-linked task may provide the input task content using execution of a predetermined device as a trigger. In addition, the device-linked task may provide the input task content using execution of a predetermined application in a predetermined device as a trigger.

As described above, an electronic device that reminds of a task that is different from a time or space information-based reminder application according to the related art, and a controlling method thereof may be provided.

FIG. 7B is a flowchart illustrating a method of displaying a device-linked task according to an embodiment of the present disclosure.

Referring to FIG. 7B, at operation S711, the related device 800 may receive and store, for example, the device-linked task generated through the process of FIG. 7A. The related device 800 may monitor execution of a trigger for the device-linked task.

For example, a task manager may be defined in a framework of an OS of the related device 800. The task manager may manage execution and termination of an application, and the related device 800 may determine whether to execute a related application or to execute a device based on management items of the task manager. The related device 800 may determine whether to execute a device based on whether a touch screen 890 of the related device 800 is driven. For example, when a user inputs a driving command for the touch screen 890 so as to manipulate the related device 800, a controller of the related device 800 may display a device-linked task using the input of the driving command for the touch screen 890 as a trigger.

Figure 8D:
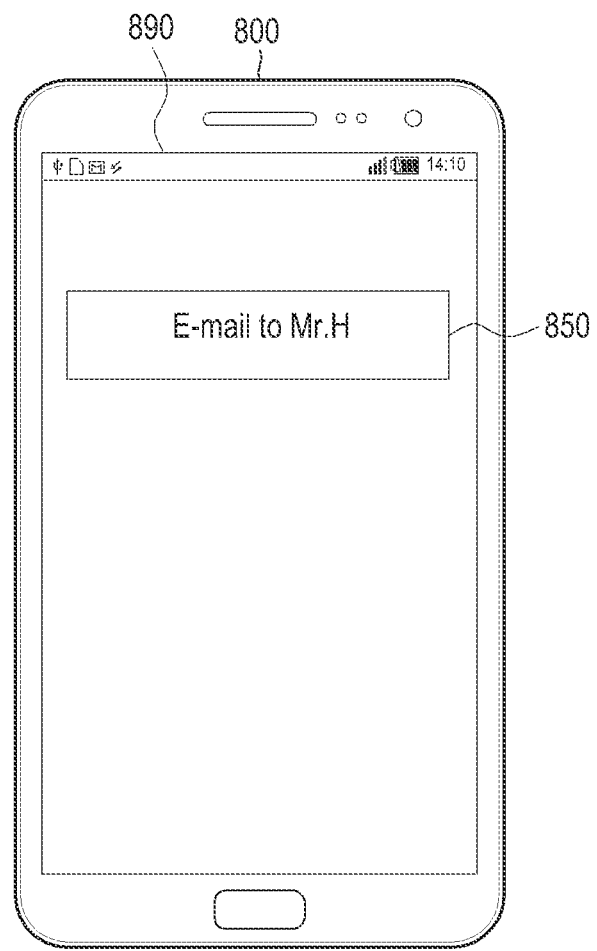

When the application or the device is determined to be executed, at operation S713, the controller of the related device 800 may perform a control to display a stored device-linked task 850 as illustrated in FIG. 8D. As described above, through the device-linked task generated in the electronic device 100, a reminder may also be performed in the related device 800.

Figure 9A:
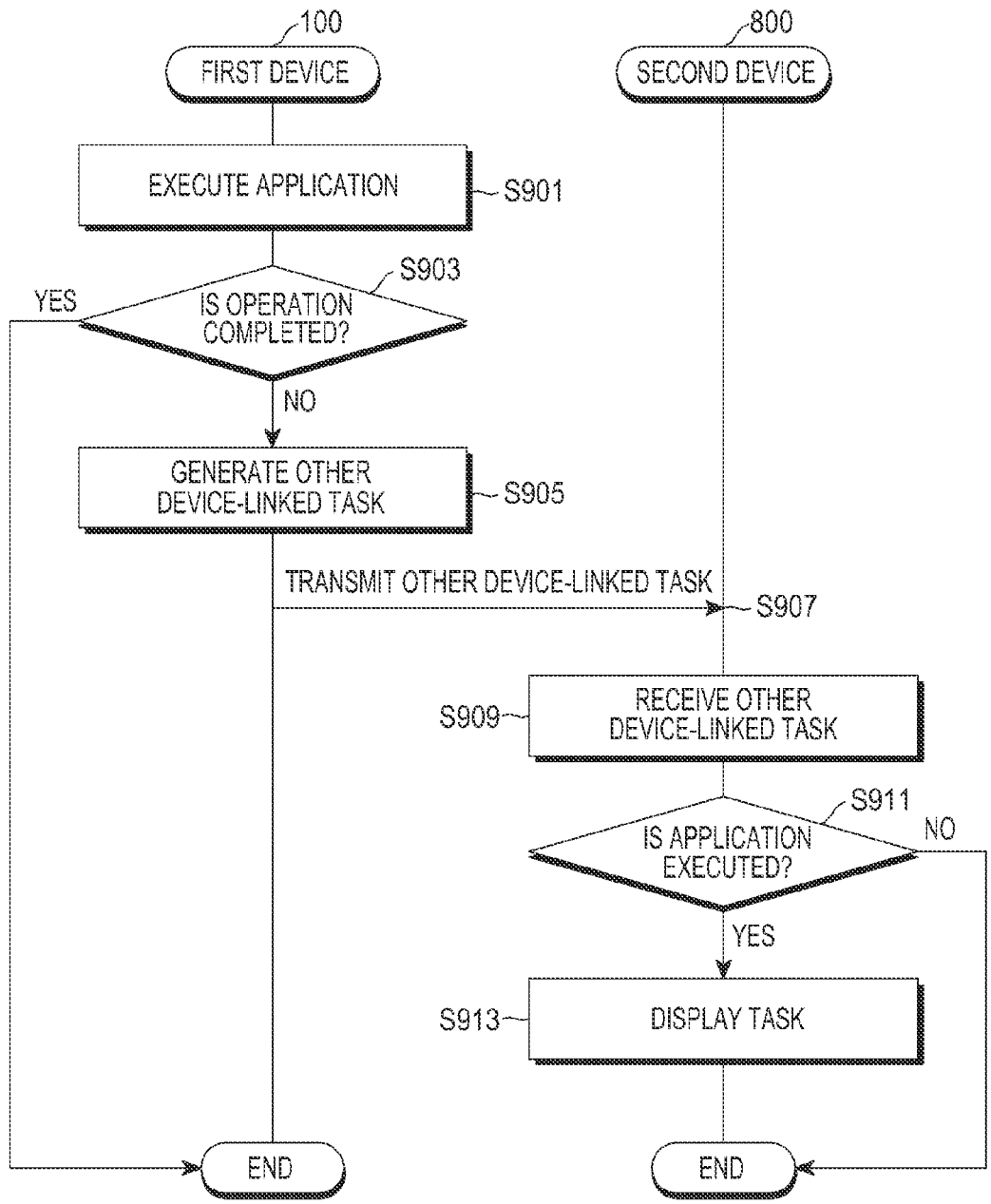
FIGS. 9A and 9B are flowcharts illustrating a method of controlling a plurality of electronic devices according to an embodiment of the present disclosure.
Figure 9B:
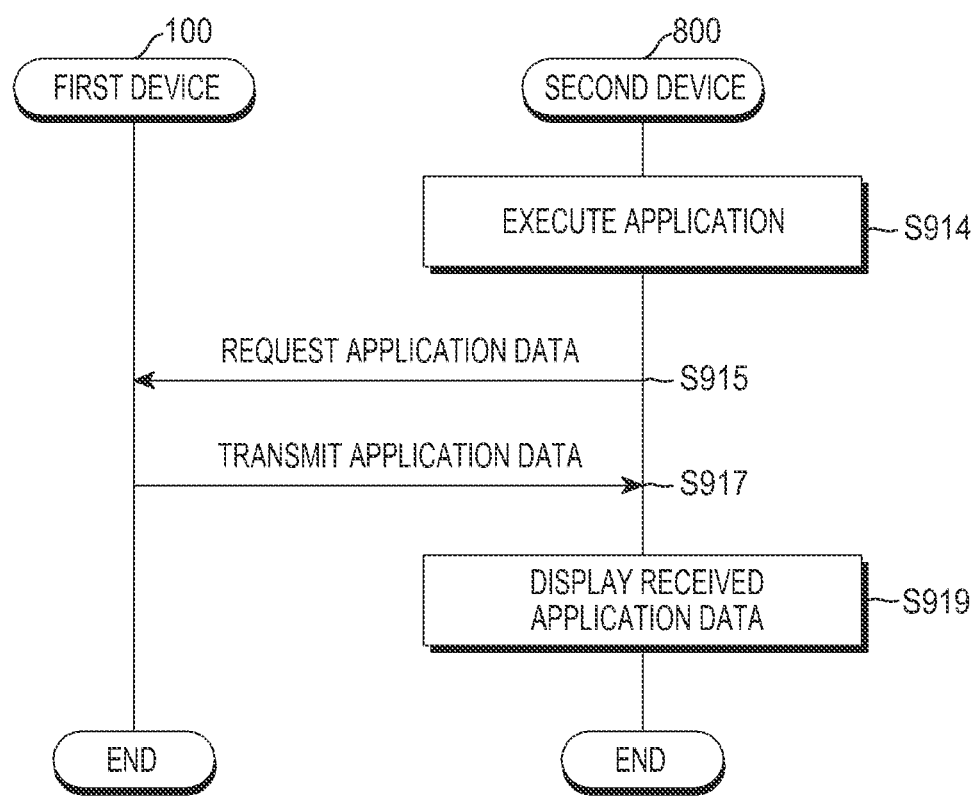

FIGS. 9A and 9B are flowcharts illustrating a method of controlling a plurality of electronic devices according to an embodiment of the present disclosure. FIGS. 10A, 10B, 10C, and 10D are conceptual diagrams illustrating an electronic device according to various embodiments of the present disclosure. The controlling method of FIGS. 9A and 9B will be described in detail with reference to FIGS. 10A, 10B, 10C, and 10D.

Referring to FIG. 9A, at operation S901, a first electronic device 100 may execute an application. The first electronic device 100 may execute and display, for example, a memo application 1000, as illustrated in FIG. 1 OA. A user may input a predetermined data to the memo application 1000 using, for example, a stylus pen 1.

Figure 10A:
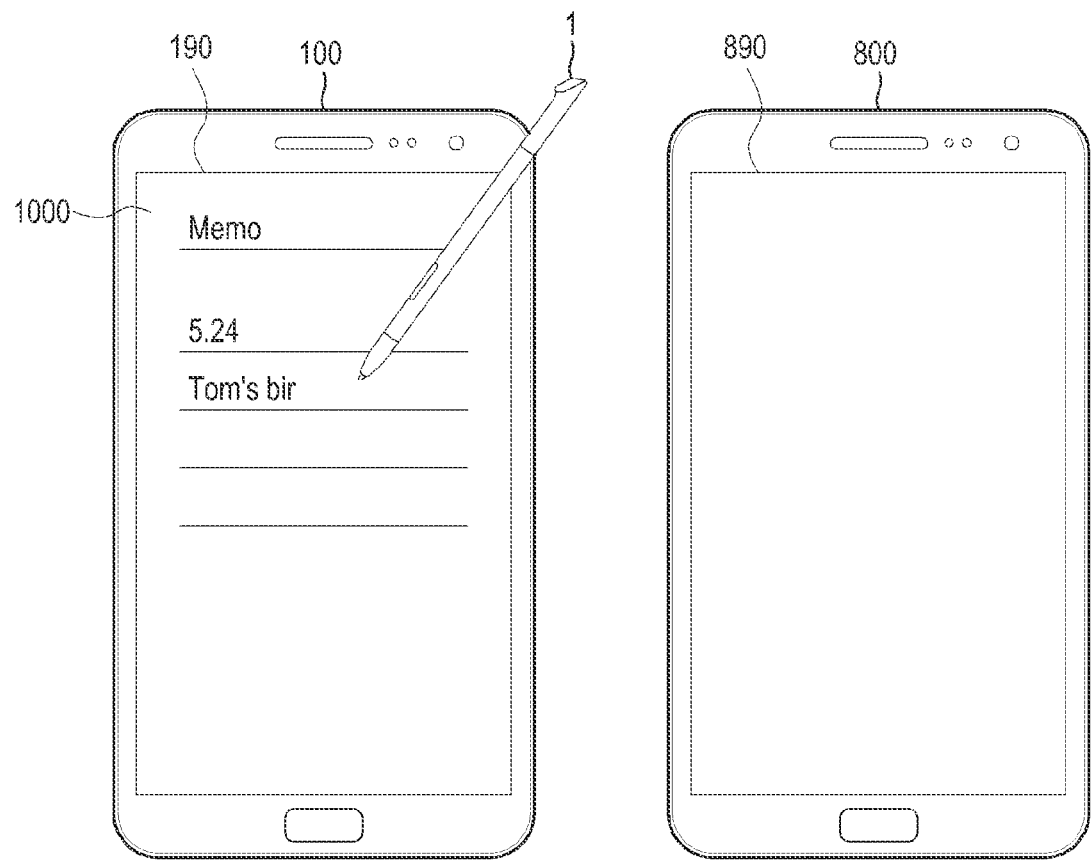
FIGS. 10A, 10B, 10C, and 10D are conceptual diagrams illustrating an electronic device according to various embodiments of the present disclosure.

At operation S903, the first electronic device 100 may determine whether an operation input into the application being executed is completed. For example, a task manager of the first electronic device 100 may determine whether an operation input into the application is completed based on whether the application being executed is terminated. The first electronic device 100 may determine that the operation is completed when the application being executed is terminated based on a termination command. In addition, the first electronic device 100 may determine whether the operation is completed based on whether data is output from the application being executed. For example, the first electronic device 100 may execute the memo application 1000, as illustrated in FIG. 10A. The user may designate a complete button when inputting a predetermined memo is completed. In this case, the memo application 1000 may request storing completely input memo data, and the controller 110 may determine whether the operation is completed based on the request for storing the memo data from the application being executed.

When the first electronic device 100 determines that the operation is not completed in operation S903, the first electronic device 100 may proceed to operation S905 at which the first electronic device 100 may generate a task linked with another device.

Figure 10B:
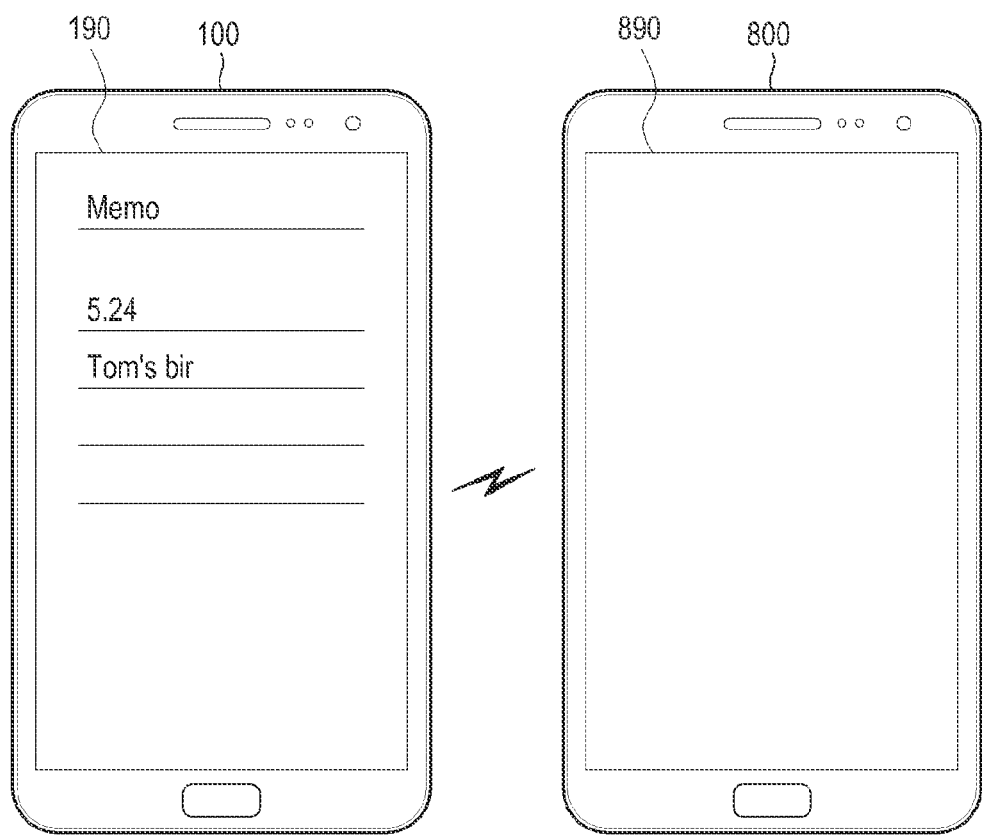

According to various embodiments of the present disclosure, the first electronic device 100 may automatically generate the other device-linked task without intervention by a user. For example, at operation S907, the first electronic device 100 may transmit the other device-linked task to at least one linked electronic devices, as illustrated in FIG. 10B. The other device-linked task may include property information of the application being executed.

At operation S909, a second electronic device 800 may receive the other device-linked task, and may determine application property information included in the other device-linked task.

At operation S911, the second electronic device 800 may determine whether the determined application is executed.

When the second electronic device 800 determines that the determined application is executed, the second electronic device 800 may proceed to operation S913 at which the second electronic device 800 may display a task. For example, the second electronic device 800 may display a message indicating that an operation that is not completed in the first electronic device 100 exists. In addition, the second electronic device 800 may display a message inquiring whether to continue executing the incomplete operation.

FIG. 9B is a flowchart illustrating a case in which the second electronic device 800 continuously executes the incomplete operation.

Figure 10C:
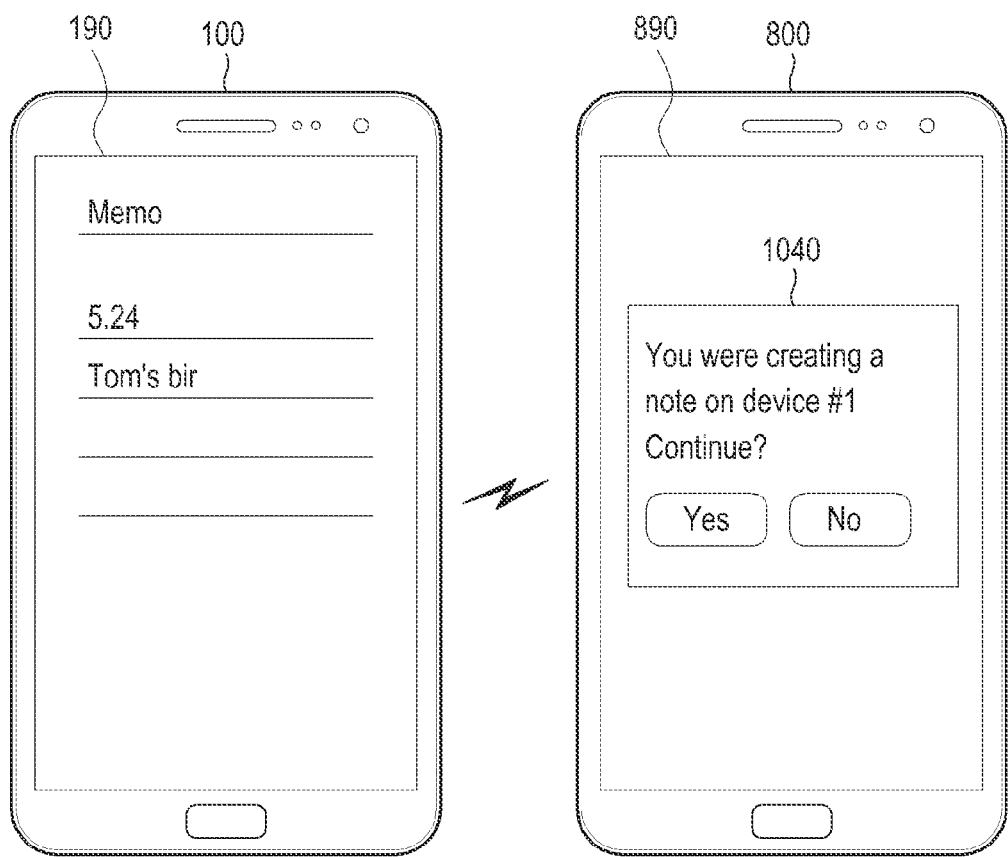

At operation S914, the second electronic device 800 may display a message indicating that an operation that is not completed in the first electronic device 100, and a message inquiring whether to continue executing the incomplete operation. For example, as illustrated in FIG. 10C, the second device 800 may display a message 1040 inquiring whether the user wishes to continue executing the incomplete operation.

When a user designates continuous execution of the incomplete operation, at operation S915, the second electronic device 800 may request application data from the first electronic device 100.

At operation S917, the first electronic device 100 may transmit the incomplete application data.

Figure 10D:
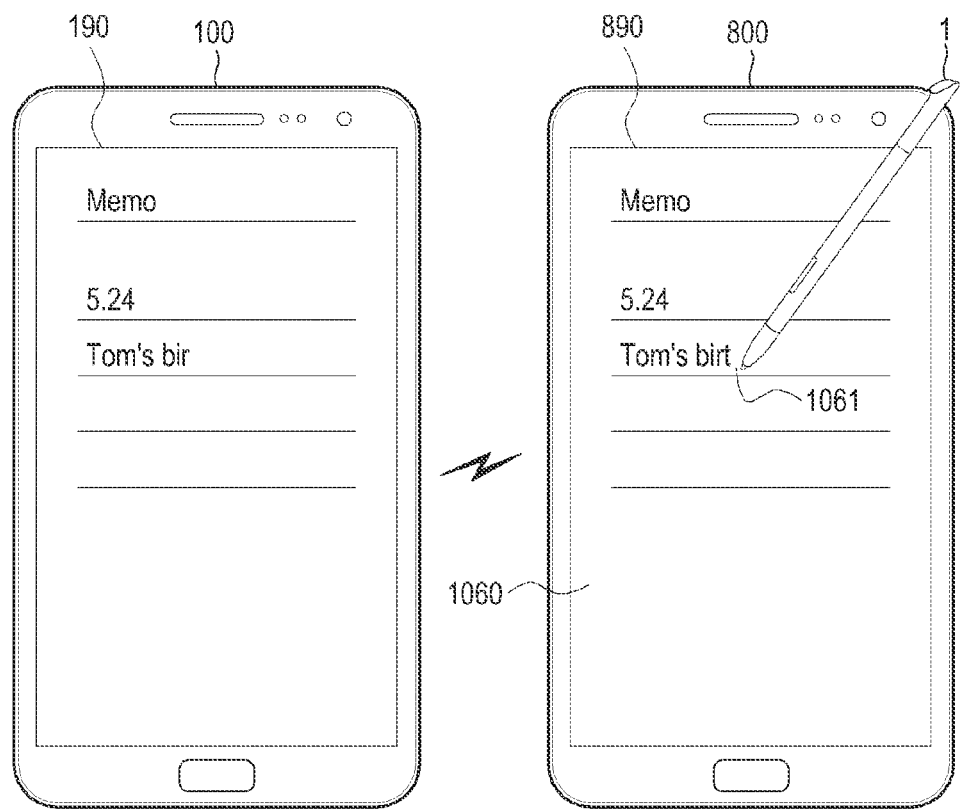

At operation S919, the second electronic device 800 may display the incomplete application data, and the user may perform an additional operation 1061, as illustrated in FIG. 10D (e.g., the user may input further notes to the memo using the pen 1).

Figure 11:
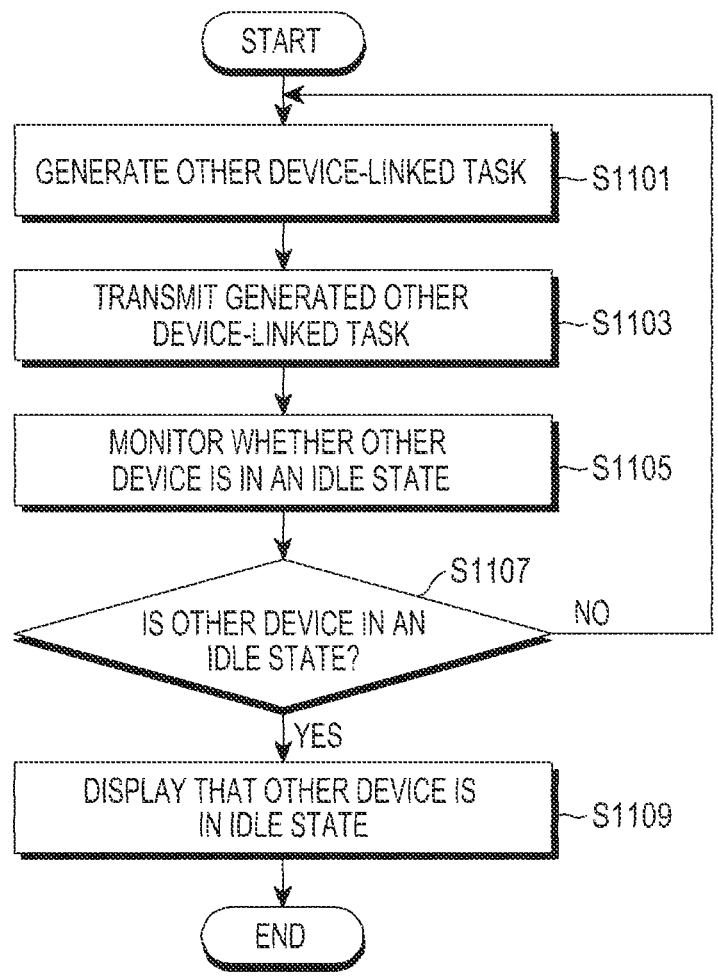
FIG. 11 is a flowchart illustrating a method of controlling an electronic device according to an embodiment of the present disclosure.
Figure 12:
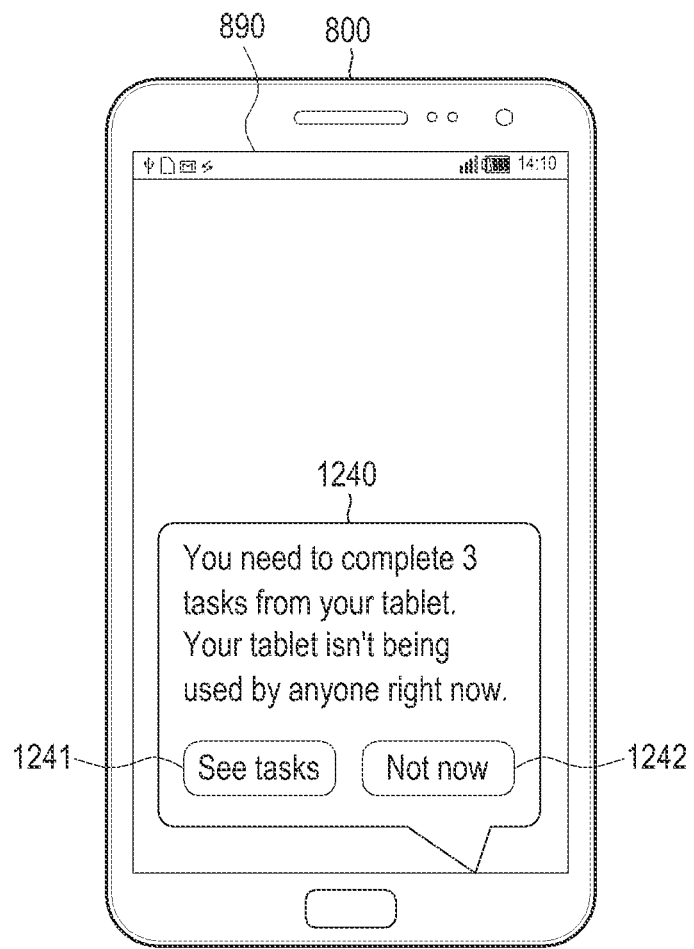
FIG. 12 is a conceptual diagram illustrating a message indicating that another device is in an idle state according to an embodiment of the present disclosure.

FIG. 11 is a flowchart illustrating a method of controlling an electronic device according to an embodiment of the present disclosure. FIG. 12 is a conceptual diagram illustrating a message indicating that another device is in an idle state according to an embodiment of the present disclosure.

At operation S1101, the electronic device 100 may generate another device-linked task.

At operation S1103, the electronic device 100 may transmit the other device-linked task to another device.

At operation S1105, the electronic device 100 may monitor whether the other device is in an idle state.

At operation S1107, the electronic device 100 may determine whether the other device is in an idle state. For example, when a signal is not received from the other device during a predetermined period of time, the electronic device 100 may determine that the other device is in an idle state.

In addition, the electronic device 100 may receive information associated with whether the other device is in an idle state from a server that monitors an operation state of the other device. For example, the server may monitor the operation state of the other device, and when the server determines that the operation state of the other device is in an idle state, the server may transmit, to the electronic device 100, a signal indicating that the other device is in an idle state. For example, the electronic device 100 may receive a signal associated with a state from the other device based on a pull scheme, or may receive a signal associated with a state of the other device from the server.

When the other device is determined to be in an idle state in operation S1107, the electronic device 100 may proceed to operation S1109 at which the electronic device 100 may display, for example, a message 1240 indicating that the other device is in an idle state, as illustrated in FIG. 12. The message 1240 may include a button 1241 for determining a task to be performed in the other device and a refusal button 1242.

Figure 13A:
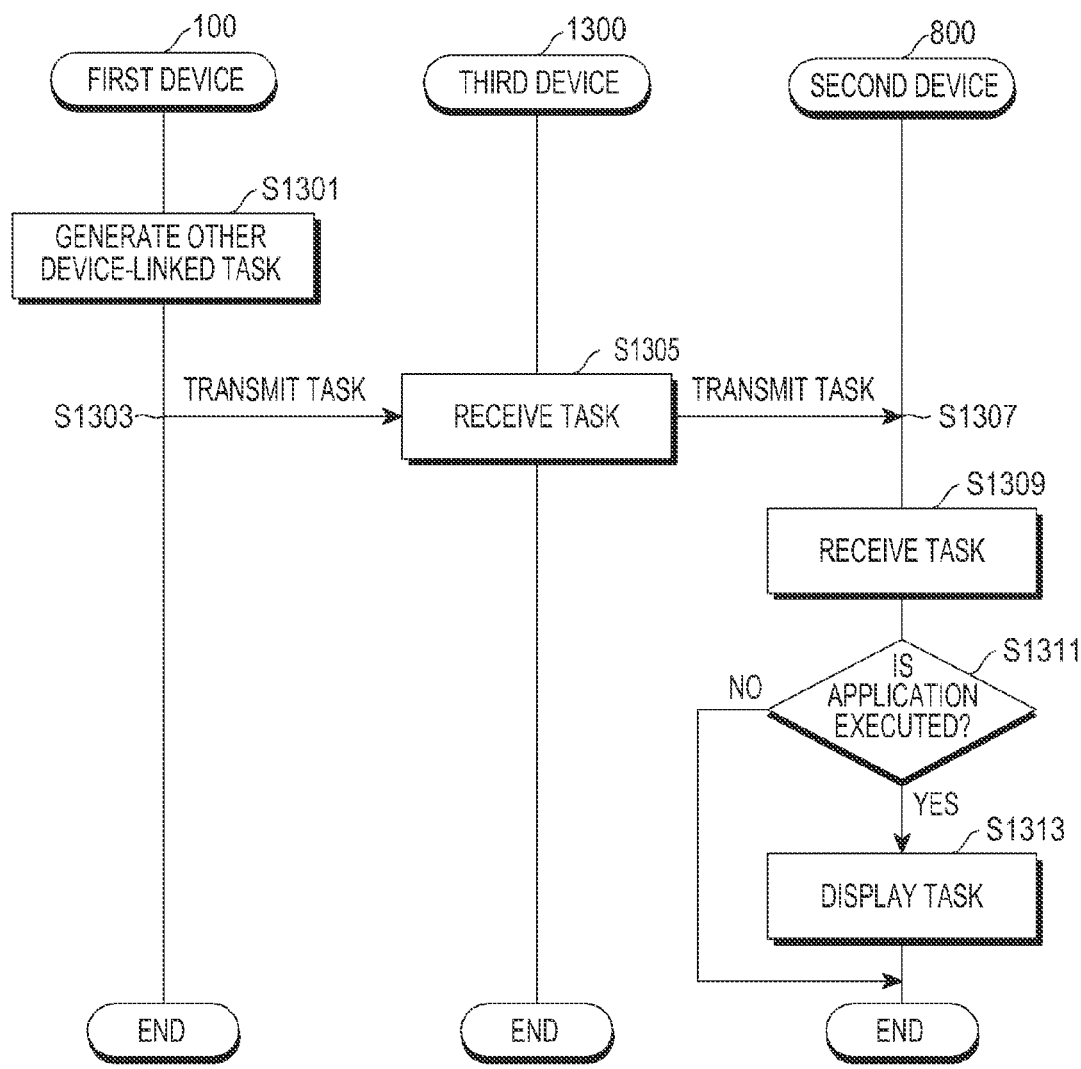
FIGS. 13A and 13B are flowcharts illustrating a method of controlling a plurality of electronic devices according to an embodiment of the present disclosure.
Figure 13B:
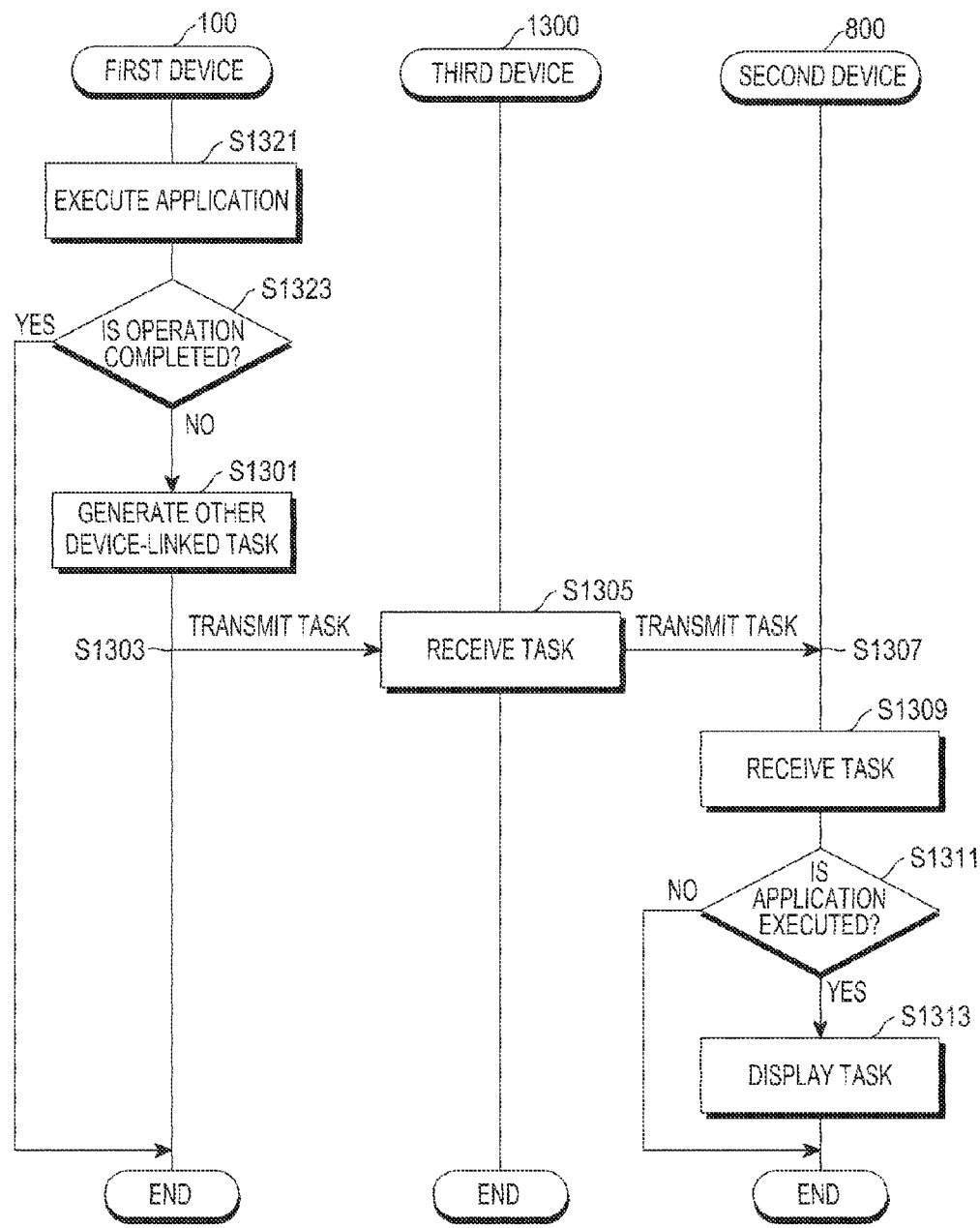

FIGS. 13A and 13B are flowcharts illustrating a method of controlling a plurality of electronic devices according to an embodiment of the present disclosure.

Referring to FIG. 13A, at operation S1301, the first electronic device 100 may generate a task linked with another device. In this case, the first electronic device 100 may automatically generate the other device-linked task without intervention by a user.

At operation S1303, the first electronic device 100 may transmit the other device-linked task to a linked third device 1300. The other device-linked task may include property information of an application being executed.

At operation S1305, the third electronic device 1300 may receive the other device-linked task.

At operation S1307, the third electronic device 1300 may transmit the received other device-linked task to the second electronic device 800. For example, the third electronic device 1300 may be embodied as a proxy server or a node based on an ad-hoc scheme.

At operation S1309, the second electronic device 800 may receive the other device-linked task. The second electronic device 800 may determine application property information included in the other device-linked task.

At operation S1311, the second electronic device 800 may determine whether the determined application is executed.

When the second electronic device 800 determines that the determined application is executed at operation S1311, the second electronic device 800 may proceed to operation S1313 at which the second electronic device 800 may display a task.

FIG. 13B is associated with the embodiment of the present disclosure illustrated in FIG. 9A in which another device-linked task is generated when an operation with respect to an application is not completed during a process in which the first electronic device 100 generates the other device-linked task.

At operation S1321, the first electronic device 100 may execute an application.

At operation S1323, the first electronic device 100 may determine whether an operation input into the application being executed is completed in operation S1323.

When the first electronic device 100 determines that the operation is not completed in operation S903 of FIG. 9A, the first electronic device 100 may proceed to operation S1301 at which the first electronic device 100 may generate the other device-linked task.

Operations S1303 to S1313 have been described with reference to FIG. 13A and thus, detailed descriptions thereof will be omitted.

It may be appreciated that the various embodiments of the present disclosure can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. In addition, it will be appreciated that the various embodiments of the present disclosure may be implemented by a computer or a portable terminal which includes a control unit and a memory, in which the memory may be an example of a storage medium that is readable by a machine that is suitable for storing one or more programs that include instructions for implementing the various embodiments of the present disclosure.

Accordingly, the present disclosure includes a program for a code implementing the apparatus and method described in the appended claims of the specification and a non-transitory machine (a computer or the like)-readable storage medium for storing the program. Moreover, such a program as described above can be electronically transferred through an arbitrary medium such as a communication signal transferred through cable or wireless connection, and the present disclosure properly includes the things equivalent to that.

Further, the device can receive the program from a program providing apparatus connected to the device wirelessly or through a wire and store the received program. The program supply apparatus may include a program that includes instructions to execute the various embodiments of the present disclosure, a memory that stores information or the like required for the various embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling an electronic device that provides a reminder of a task, the method comprising:
    controlling, by at least one processor, a touch screen to receive an input of task content through a first application;
    designating, by the at least one processor, a second application associated with the task content while the first application is being executed;
    generating, by the at least one processor, a reminder target task based on the second application while the first application is being executed; and
    when executing the second application after the first application is terminated, controlling, by the at least one processor, the touch screen to display an execution screen of the second application with the generated reminder target task.

2. The method of claim 1, wherein the designating of the second application associated with the task content comprises:
    determining an application corresponding to the input task content; and
    designating the determined corresponding application as the second application.

3. The method of claim 1, wherein the designating of the second application associated with the task content comprises:
    displaying a list of at least one application associated with the task content on an execution screen of the first application; and
    receiving a designation of the second application in the list of the at least one application.

4. The method of claim 3,
    wherein the first application is a task generating User Interface (UI), and
    wherein the method further comprises:
        displaying the task generating User Interface (UI) in which the task content and the second application are designated.

5. The method of claim 1, further comprising:
    executing an application before generating the reminder target task.

6. The method of claim 5, wherein the designating of the second application associated with the task content comprises:
    designating the executed application as the second application.

7. The method of claim 6, further comprising:
    determining a property of the executed application;
    collecting data of the executed application; and
    displaying a task generating User Interface (UI) including at least one of the determined property and the collected data.

8. The method of claim 7, wherein the receiving of the input of the task content comprises:
    inputting the collected data as the task content.

9. An electronic device that provides a reminder of a task, the electronic device comprising:
    a touch screen configured to receive an input of task content through a first application; and
    at least one processor configured to:
        designate a second application associated with the task content while the first application is being executed;
        generate a reminder target task based on the second application while the first application is being executed; and
        when executing the second application after the first application is terminated, displaying an execution screen of the second application with the generated reminder target task.

10. The electronic device of claim 9, wherein the at least one processor is further configured to determine an application corresponding to the input task content, and to designate the determined corresponding application as the second application.

11. The electronic device of claim 9, wherein the touch screen is further configured to display a list of at least one application associated with the task content on an execution screen of the first application, and to receive a designation of the second application in the list of the at least one application.

12. The electronic device of claim 11,
    wherein the first application is a task generating User Interface (UI), and wherein the touch screen is further configured to display the task generating User Interface (UI) in which the task content and the second application are designated.

13. The electronic device of claim 9, wherein the at least one processor is further configured to execute an application before generating the reminder target task.

14. The electronic device of claim 13, wherein the at least one processor is further configured to designate the executed application as the second application.

15. The electronic device of claim 14, wherein the at least one processor is further configured to determine a property of the executed application, to collect data of the executed application, and to display a task generating User Interface (UI) including at least one of the determined property and the collected data.

16. The electronic device of claim 15, wherein the at least one processor is further configured to determine the collected data as the task content.

17. A method of controlling an electronic device that performs a control so as to remind of a task in another device, the method comprising:
receiving an input of task content through a first application;
designating a related device and a second application associated with the task content;
generating a reminder target task based on the related device and the second application; and
transmitting the generated reminder target task to the related device,
wherein the transmitted reminder target task includes a command to control the related device to display the reminder target task when executing the second application in the related device, the second application executing after the first application is terminated.

18. The method of claim 17, wherein the designating of the related device associated with the task content comprises:
displaying a list of at least one electronic device associated with the electronic device; and
receiving a designation of the related device in the list of the at least one electronic device.

19. The method of claim 17,
wherein the first application is a task generating User Interface (UI),
wherein the method further comprises:
displaying the task generating User Interface (UI) in which the task content and the related device are displayed.

20. The method of claim 17, further comprising:
executing an application before generating the reminder target task,
wherein the generating of the reminder target task comprises:
determining whether an operation input into the application is completed; and
generating the reminder target task when the operation is not completed.

21. The method of claim 17, further comprising:
monitoring whether the related device is in an idle state; and
displaying a message indicating that the related device is in an idle state when the related device is determined to be in an idle state during a predetermined period of time.

22. A method of controlling an electronic device that provides a reminder of a task, the method comprising:
receiving, from another device, a reminder target task generated based on a related application associated with task content input while a first application is being executed at the another device; and
when executing the related application associated with the task content of the received reminder target task, displaying an execution screen of the related application with the task content of the received reminder target task.

23. The method of claim 22, wherein the reminder target task is generated when an operation input into an application executed in the another device is determined to be not completed; and
wherein the displaying further comprises displaying a message indicating that the operation executed in the another device is not completed.

24. The method of claim 23, wherein the displaying comprises:
displaying a message querying whether to continue executing the operation;
receiving an input of a continue-execution command for the operation;
receiving application data from the another device; and
displaying the received application data.

25. An electronic device that performs a control so as to remind of a task in another device, the electronic device comprising:
a touch screen configured to receive an input of task content through a first application;
at least one processor configured to designate a related device and a second application associated with the task content, and to generate a reminder target task based on the related device and the second application; and
a transceiver configured to transmit the generated reminder target task to the related device,
wherein the transmitted reminder target task includes a command to control the related device to display the reminder target task when executing the second application in the related device, the second application executing after the first application is terminated.

26. The electronic device of claim 25, wherein the touch screen is further configured to display a list of at least one electronic device associated with the electronic device, and to receive a designation of the related device in the list of at least one electronic device.

27. The electronic device of claim 25,
wherein the first application is a task generating User Interface (UI),
wherein the touch screen is further configured to display the task generating User Interface (UI) in which the task content and the related device are designated.

28. The electronic device of claim 25, wherein the at least one processor is further configured to execute an application before generating the reminder target task, to determine whether an operation input into the application is completed, and to generate the reminder target task when the operation is determined to be not completed.

29. The electronic device of claim 25, wherein the at least one processor is further configured to perform a control to monitor whether the related device is in an idle state, and to display a message indicating that the related device is an idle state when the related device is determined to be in an idle state during a predetermined period of time.

30. An electronic device that provides a reminder of a task, the electronic device comprising:

a transceiver configured to receive, from another device, a reminder target task generated based on a related application associated with task content input while a first application is being executed at the another device; and at least one computer processor configured to display, when executing the related application associated with task content of the received reminder target task, an execution screen of the related application with the task content of the received reminder target task, the related application executing after the first application is terminated.

31. The electronic device of claim 30, wherein the reminder target task is generated when an operation input into an application executed in another device is determined to be not completed; and the electronic device further comprises a touch screen configured to display a message indicating that the operation executed in the another device is not completed.

32. The electronic device of claim 31, wherein the touch screen is further configured to display a message inquiring whether to continue executing the operation, and to receive an input of a continue-execution command for the operation; and the at least one computer processor is further configured to display received application data when the transceiver receives the application data from the another device.

33. A non-transitory computer-readable storage medium storing instructions that, when executed, cause at least one processor to perform the method of claim 1.

34. A non-transitory computer-readable storage medium storing instructions that, when executed, cause at least one processor to perform the method of claim 17.

35. A non-transitory computer-readable storage medium storing instructions that, when executed, cause at least one processor to perform the method of claim 22.

36. The method of claim 1, wherein the second application is an application other than the first application.

* * * * *